US010666606B2

(12) United States Patent
Voegele et al.

(10) Patent No.: US 10,666,606 B2
(45) Date of Patent: May 26, 2020

(54) VIRTUAL PRIVATE NETWORK SERVICE ENDPOINTS

(71) Applicant: Amazon Technologies, Inc., Seattle, WA (US)

(72) Inventors: Michael Siaosi Voegele, Bethesda, MD (US); Kevin Christopher Miller, Bainbridge Island, WA (US); Justin Canfield Crites, Seattle, WA (US); Andriy Palamarchuk, Great Falls, VA (US); Andrew Bruce Dickinson, Seattle, WA (US); Christopher Carson Thomas, Seattle, WA (US); Rebecca Claire Weiss, Vienna, CA (US)

(73) Assignee: Amazon Technologies, Inc., Seattle, WA (US)

( * ) Notice: Subject to any disclaimer, the term of this patent is extended or adjusted under 35 U.S.C. 154(b) by 51 days.

(21) Appl. No.: 15/636,523

(22) Filed: Jun. 28, 2017

(65) Prior Publication Data
US 2019/0007366 A1    Jan. 3, 2019

(51) Int. Cl.
*H04L 29/12* (2006.01)
*H04L 12/46* (2006.01)
(Continued)

(52) U.S. Cl.
CPC ...... *H04L 61/1541* (2013.01); *H04L 12/4633* (2013.01); *H04L 45/745* (2013.01);
(Continued)

(58) Field of Classification Search
CPC ............ H04L 61/1541; H04L 12/4633; H04L 45/745; H04L 47/125; H04L 61/1511;
(Continued)

(56) References Cited

U.S. PATENT DOCUMENTS 8,073,934 B1    12/2011    Zhong et al.
9,430,295 B1    8/2016    Eizadi et al.
(Continued)

FOREIGN PATENT DOCUMENTS

WO    WO-2017080391 A1 *    5/2017    ............. G06F 9/455

OTHER PUBLICATIONS

International Search Report and Written Opinion from PCT/US2018/038902, dated Oct. 5, 2018, Amazon Technologies, Inc., pp. 1-13.

*Primary Examiner* — Wutchung Chu
(74) *Attorney, Agent, or Firm* — Robert C. Kowert; Kowert, Hood, Munyon, Rankin & Goetzel, P.C.

(57) ABSTRACT

A customer may request a service endpoint for a service in their virtual network on a provider network. In response, a service endpoint is generated in the customer's virtual network, a local IP address in the IP address range of the customer's virtual network is assigned to the service endpoint, and a DNS name is assigned to the service endpoint. Resources on the customer's virtual network resolve the DNS name of the service endpoint to obtain the local IP address of the service endpoint and send service requests for the service to the local IP address of the service endpoint. The service endpoint adds routing information to the service requests and sends the service requests over the network substrate to be routed to the service.

20 Claims, 20 Drawing Sheets

(51) Int. Cl.
　　　*H04L 12/741*　　　(2013.01)
　　　*H04L 12/803*　　　(2013.01)

(52) U.S. Cl.
　　　CPC ........ *H04L 47/125* (2013.01); *H04L 61/1511* (2013.01); *H04L 61/2007* (2013.01); *H04L 61/305* (2013.01); *H04L 2212/00* (2013.01)

(58) Field of Classification Search
　　　CPC ............. H04L 61/2007; H04L 2212/00; H04L 61/6068
　　　See application file for complete search history.

(56) References Cited

U.S. PATENT DOCUMENTS

| | | | | |
|---|---|---|---|---|
| 9,495,188 | B1* | 11/2016 | Ettema | G06F 9/45533 |
| 9,667,486 | B2* | 5/2017 | Gokhale | H04L 41/0809 |
| 9,841,988 | B1* | 12/2017 | Magnezi | G06F 9/45558 |
| 10,015,094 | B1* | 7/2018 | Akers | H04L 61/6068 |
| 2003/0074472 | A1* | 4/2003 | Lucco | H04L 29/12066 |
| | | | | 709/245 |
| 2009/0276771 | A1* | 11/2009 | Nickolov | G06F 9/4856 |
| | | | | 717/177 |
| 2009/0327517 | A1* | 12/2009 | Sivasubramanian | |
| | | | | H04L 29/12132 |
| | | | | 709/238 |
| 2010/0186079 | A1* | 7/2010 | Nice | H04L 63/0281 |
| | | | | 726/14 |
| 2011/0154319 | A1* | 6/2011 | Carter-Schwendler | |
| | | | | H04L 69/16 |
| | | | | 718/1 |
| 2011/0261828 | A1* | 10/2011 | Smith | H04L 12/462 |
| | | | | 370/401 |
| 2011/0277027 | A1* | 11/2011 | Hayton | H04L 63/0815 |
| | | | | 726/8 |
| 2012/0281706 | A1* | 11/2012 | Agarwal | H04L 67/1002 |
| | | | | 370/395.53 |
| 2012/0287936 | A1* | 11/2012 | Biswas | H04L 12/4641 |
| | | | | 370/395.3 |
| 2013/0046874 | A1* | 2/2013 | Cohn | G06F 9/5061 |
| | | | | 709/223 |
| 2013/0047151 | A1* | 2/2013 | Sridharan | G06F 9/45558 |
| | | | | 718/1 |
| 2013/0058346 | A1* | 3/2013 | Sridharan | H04L 12/4666 |
| | | | | 370/392 |
| 2013/0067085 | A1* | 3/2013 | Hershko | H04L 61/157 |
| | | | | 709/225 |
| 2013/0262801 | A1* | 10/2013 | Sancheti | G06F 3/065 |
| | | | | 711/162 |
| 2014/0282817 | A1* | 9/2014 | Singer | H04L 63/08 |
| | | | | 726/1 |
| 2014/0304412 | A1* | 10/2014 | Prakash | H04L 61/1511 |
| | | | | 709/226 |
| 2014/0351447 | A1* | 11/2014 | Annamalaisami | |
| | | | | H04L 65/1069 |
| | | | | 709/227 |
| 2015/0324215 | A1* | 11/2015 | Borthakur | G06F 9/45558 |
| | | | | 718/1 |
| 2016/0057071 | A1* | 2/2016 | Parikh | H04L 47/10 |
| | | | | 709/226 |
| 2016/0087940 | A1* | 3/2016 | Miller | G06F 9/45558 |
| | | | | 726/15 |
| 2016/0203528 | A1* | 7/2016 | Saha | G06Q 30/04 |
| | | | | 705/34 |
| 2016/0255118 | A1* | 9/2016 | Wang | H04L 63/1441 |
| | | | | 726/1 |
| 2017/0093911 | A1* | 3/2017 | Robertson | H04L 63/1491 |
| 2017/0272400 | A1* | 9/2017 | Bansal | H04L 41/0806 |
| 2017/0339247 | A1* | 11/2017 | Tiwari | H04W 76/11 |
| 2018/0007033 | A1* | 1/2018 | Ajitomi | H04L 63/0442 |

* cited by examiner

VIRTUAL PRIVATE NETWORK SERVICE ENDPOINTS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers or clients. Some public data center operators provide network access, power, and secure installation facilities for hardware owned by various clients, while other public data center operators provide "full service" facilities that also include hardware resources made available for use by their clients. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many clients with diverse needs, allowing various computing resources to be efficiently and securely shared by multiple clients. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

Figure 1A:
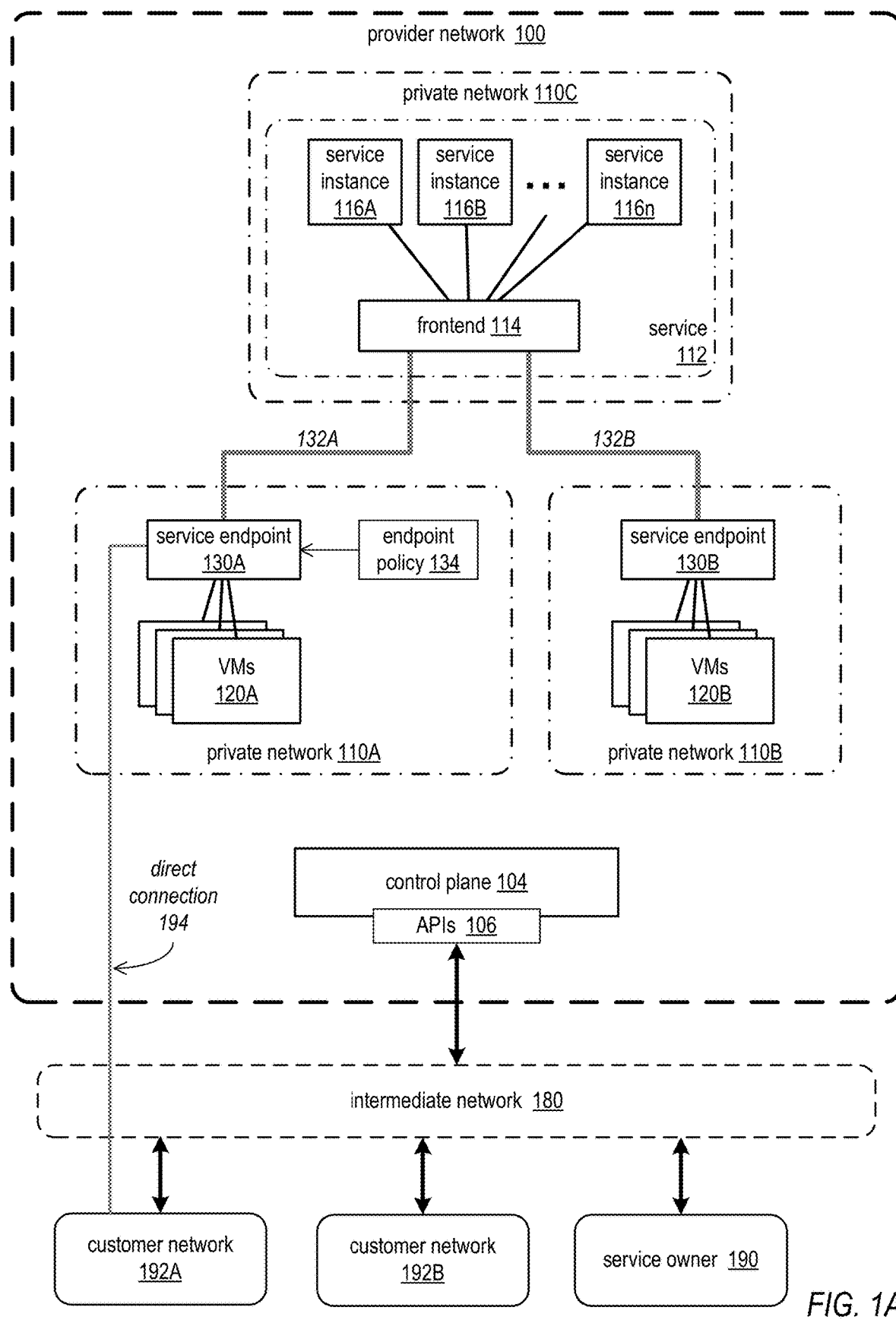
FIG. 1A illustrates an example service in a service private network on a provider network with service endpoints in customer private networks, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various embodiments of methods and apparatus for providing service endpoints to services in provider network environments are described. Embodiments of methods and apparatus for providing service endpoints may, for example, be implemented in the context of a provider network that provides virtual resources such as computing resources executing as virtual machines (VMs), as well as other virtual resources such as virtual storage, to customers via an intermediate network such as the Internet. The provider network may include a network substrate and a control plane implemented by one or more data centers, and may host one or more virtual computing services and application programming interfaces (APIs) that allow customers to establish, provision, and manage their virtualized resources in virtualized private networks (referred to herein as private networks, virtual private networks, or virtual networks) on the provider network.

In virtual network environments that allow clients to provision virtual private networks, the clients' virtual private network(s) are discrete, routed IP containers that are hosted on the provider network and that may be viewed as virtual analogs to physical networks. Conventionally, packet flows between endpoints (e.g., customers' virtual resources) in different private networks on the provider network are routed through the network substrate of the provider network to an intermediate public network such as the Internet. The intermediate network routes the packets back to the provider network. On the provider network, the packets are then routed over the network substrate to the destination private network. In some embodiments of a provider network, to provide a virtual analog to physical transit centers at which physical cables between data centers are patched to create a peering between the respective private networks at the data centers in virtual network environments within a provider network, a peering service and API may be provided that allow customers to request virtual peerings between private networks on a regional network and other private networks on the provider network. A private network peering allows packets to flow between endpoints in the two private networks over the provider network's network substrate without passing through the intermediate public network.

Services, as used herein, may include network-based software and/or hardware that is made accessible on a network by a service owner to external entities (referred to as service customers, or simply customers) via one or more public or private IP addresses and a domain name service (DNS) name. Customers may resolve a service's domain name to obtain an IP address of the service (e.g., via a DNS service) and send service requests to the service IP address. A service may be public (i.e., anyone can discover and send service requests to the service) or private (i.e., access to the service is restricted, for example to other authorized entities within a business or organization).

Services may, for example, be implemented in virtual networks (referred to herein as service private networks) on a provider network. In some embodiments, a service implemented on a service private network may include one or more service instances implemented as virtual machines in the service private network that are fronted by a frontend (e.g., a virtualized load balancer for service instances in the service private network, a virtualized gateway to the service instance(s) in the service private network, etc.). The frontend may be assigned a public or private IP address; the service may be assigned a domain name service (DNS) name, by way of example "foo.example.com". The frontend receives requests from external endpoints at the IP address and forwards or distributes the requests to the service instance(s) on the service private network. A frontend may, for example, be implemented as one or more virtual machines executing on host device(s) of the provider network. Alternatively, a frontend may be implemented by the hypervisor on a host device. A hypervisor, or virtual machine monitor (VMM), on a host device may be described as the software, firmware, and/or hardware that provides an execution environment for the virtual machines on the host device. In some embodiments, as an alternative to a service that includes a frontend to service instance(s), a service may be implemented on a service private network as one or more service instances that are directly accessible (i.e., not behind a frontend) via public or private IP addresses discoverable via the service's DNS name.

Conventionally, to access a service implemented on a service private network from a resource instance, for example a virtual machine (VM), on another virtual private network (referred to herein as a customer private network) on the provider network, the resource instance discovers the service's IP address, for example by resolving the service's DNS name through a DNS service, and sends requests to the service's IP address. The requests are routed through the network substrate of the provider network to an intermediate public network such as the Internet; the intermediate network routes the requests back to the provider network. On the provider network, the requests are then routed over the network substrate to the service's IP address on the service private network. Similarly, responses to the requests from the service back to the resource instance traverse the intermediate public network. However, this method exposes the traffic between the resource instance and the service on the public network. Further, the time it takes from sending a request to the service to receiving a response from the service is increased by the time it takes to exit the provider network, traverse the public network, and re-enter the provider network. To decrease the latency in sending requests to the service and receiving responses from the service, and to allow requests and responses to flow between the customer private network and the service private network without passing through the intermediate public network, a private network peering can be established between the two private networks. However, private network peering has limitations, for example on the number of peerings that a private network can have, and on the number of routes supported over a peering connection, so private network peering may not scale well. Furthermore, private network peering may expose resources on the service private network to the customer private network that the service private network owner does not wish to expose, and vice versa.

Embodiments of methods and apparatus are described that allow customers to establish interfaces (referred to herein as service endpoints) in their virtual private networks on the provider network (referred to as customer private networks) to services implemented in other virtual private networks on the provider network (referred to as service private networks). Service endpoints provide communications channels to the services that traverse the network substrate of the provider network but do not traverse the intermediate public network (e.g., Internet). In addition, service endpoints do not have the scaling limitations of private network peering.

Furthermore, service endpoints limit access to the service from customer private networks and limit access from the service to the customer private networks, and thus unlike private network peering do not expose resources on the service private network to the customer private network that the service private network owner does not wish to expose, and vice versa.

A service endpoint may, for example, be implemented as a virtual network interface in a customer private network. The virtual network interface may be, but is not necessarily, attached to a virtual machine in the customer private network. A service endpoint may be assigned a local IP address in the IP address range of the respective customer private network, and may be assigned a DNS name for the respective service that resolves to the respective local IP address assigned to the service endpoint. A service endpoint also records the public or private IP address of the respective service on the service private network. In some embodiments, all service endpoints to a service in customer private networks on the provider network may be assigned the same DNS name (e.g., "foo.example.com" or "com.example.foo" for a service that publishes the DNS name "foo.example.com"); when a resource instance in a customer private network invokes the DNS name of the service endpoint, the DNS name resolves to a local IP address assigned to a service endpoint in the respective customer private network. Alternatively, in some embodiments, all service endpoints to a service in customer private networks on the provider network may be assigned a DNS name that is locally (within the private network) and globally (within all private networks) unique. By way of example, for a service that publishes the DNS name "foo.example.com", a first service endpoint may be assigned a DNS name "pne-0001.foo.example.com", a second service endpoint may be assigned a DNS name "pne-0002.foo.example.com", and so on. The unique DNS name resolves to the local IP address assigned to the respective service endpoint in the customer private network.

In some embodiments, service endpoints may be implemented as records in a data structure (e.g., in a database or file) that map the local IP addresses of the service endpoints to the IP addresses of respective services. Software executing in the hypervisor or in a privileged domain on the host devices present the service endpoints to VMs executing on the host devices. When a VM sends a service request to the local IP address of a service endpoint, the software on the host device maps the local IP address to the IP address of the service, encapsulates the service request, and sends the encapsulated request on to the network substrate to be routed to the service.

A service endpoint on a customer private network may be connected to the IP address of the respective service on the service private network via a virtual path or "tunnel" over the network substrate of the provider network that does not traverse the intermediate public network, for example according to an encapsulation protocol technology. In encapsulation protocol technology, network packets may be generated by a packet source on the provider network such as a VM executing on a host device. The network packets may be encapsulated at an encapsulation layer according to an encapsulation protocol to produce encapsulation protocol packets (also referred to herein as encapsulation packets or network substrate packets). The encapsulation packets include routing information usable to route the packets through a network substrate of the provider network to a target endpoint on the provider network. The encapsulation packets may then be routed over the network substrate according to the routing information to a destination on the provider network, such as a host device that executes VMs or an edge device of the provider network, according to routing information in the encapsulation packets. The routing of the encapsulation packets over the network substrate according to the encapsulation information may be viewed as sending the encapsulation packets via overlay network routes or paths over the network substrate. At the destination, the encapsulation layer removes the network packets from the encapsulation packets (a process referred to as decapsulation) and provides or sends the decapsulated network packets to the network packet destination endpoint. For example, if the destination is a host device on the provider network, the host device may provide the network packet to a VM executing on the host device.

Figure 11:
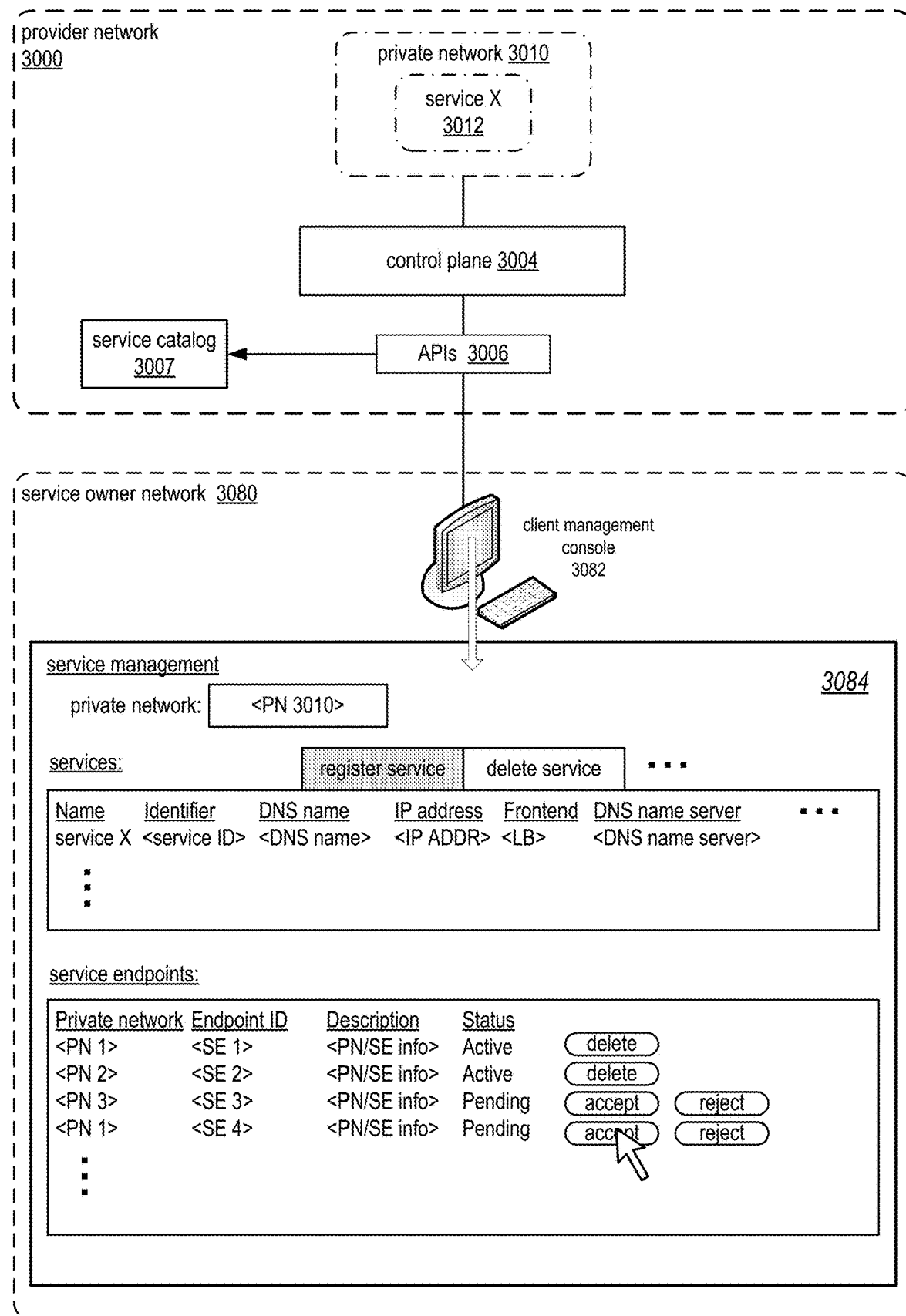
FIG. 11 shows an example interface for registering services, according to some embodiments.

In some embodiments, a service owner may register a service with the provider network, for example via an application programming interface (API) to a control plane of the provider network as illustrated in FIG. 11. The control plane may receive, via the API, a request to register the service that specifies an IP address of the service and a DNS name associated with the service. The service may then be registered with a catalog service of the provider network; services registered with the catalog service are discoverable by customers of the provider network through an API to the catalog service.

Figure 12:
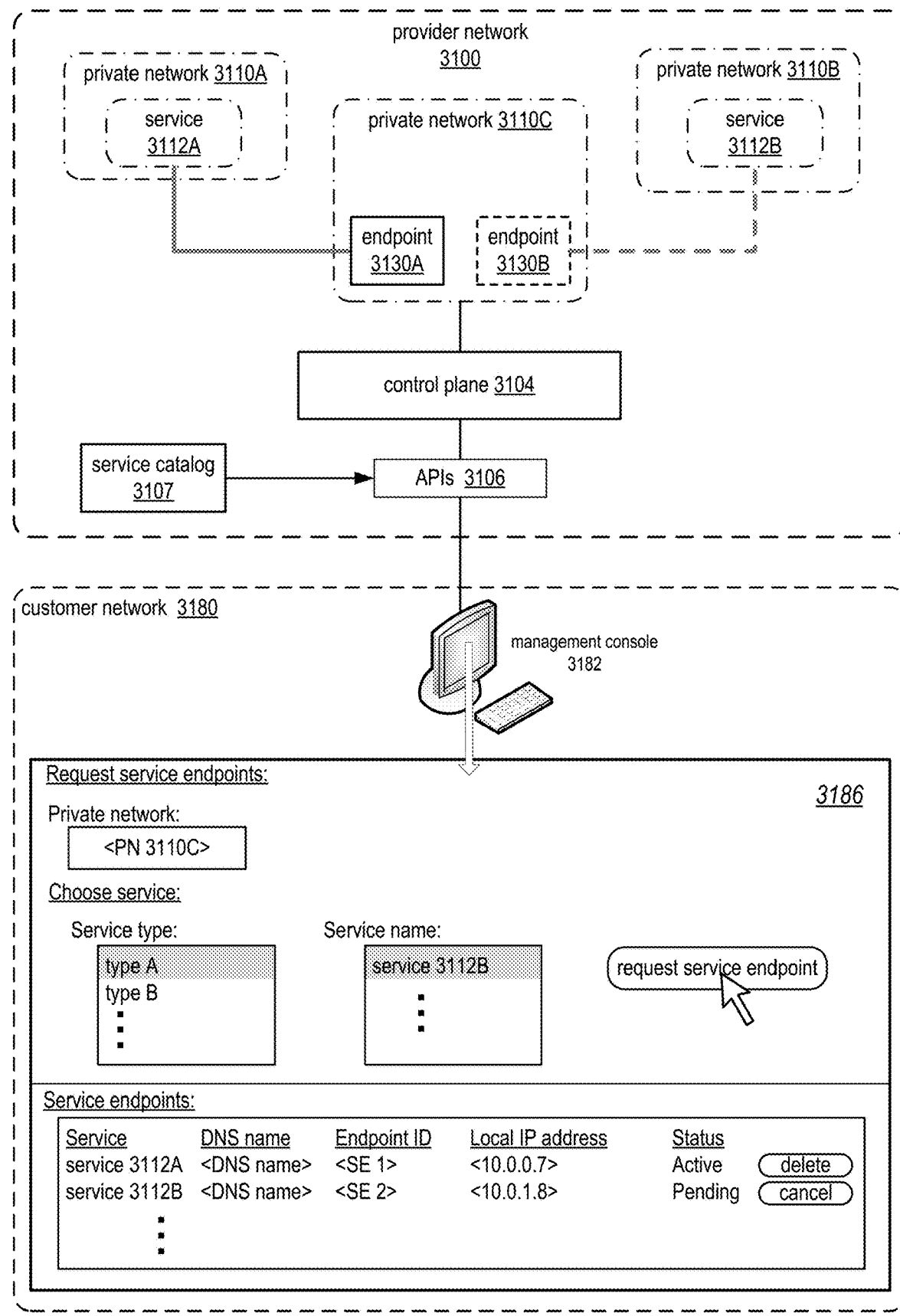
FIG. 12 shows an example interface for managing service endpoints in private networks, according to some embodiments.

In some embodiments, a customer may request a service endpoint for a service (for example, a service that the customer discovered via the catalog service) in their virtual private network on the provider network, for example via an API to the control plane of the provider network as illustrated in FIG. 12. In some embodiments, the service owner may be informed of the request, and may accept or reject the request, for example via a user interface to the API as illustrated in FIG. 11. If the request is accepted, a service endpoint for the service is generated in the customer's virtual private network (e.g., as a record in a database that maps the local IP address of the service endpoint to the IP address of the service); the service endpoint is assigned a local IP address in an IP address range of the customer's virtual private network. A DNS name is assigned to the service endpoint. A resource instance in the customer's virtual private network may then resolve the DNS name of the service endpoint to obtain the local IP address of the service endpoint in the virtual private network. The resource instance may then send service requests for the service to the local IP address of the service endpoint in the customer's virtual private network. At the service endpoint, the service requests are encapsulated with routing information usable to route the packets through a network substrate of the provider network to the service, and the encapsulated service requests are sent on to the network substrate of the provider network to be routed to the service. In some embodiments, the encapsulated service requests sent to the service from the service endpoint include information identifying the service endpoint on the customer's virtual private network. In some embodiments, the encapsulated service requests may include other information, for example information identifying the source endpoint of the service request (e.g., the VM that initiated the service request), information identifying an account of the customer that owns the virtual private network, and/or authentication and authorization information for the service endpoint on the customer's virtual private network.

In some embodiments, the IP address of the service is assigned to a frontend to the service (e.g., a load balancer). In some embodiments, the frontend decapsulates and sends or distributes the service requests received from service endpoints to one or more service instances of the service. In some embodiments, the frontend adds information identifying the service endpoint to the service requests received from the service endpoint on the virtual private network before sending the service requests to the one or more service instances; the added information may, for example, be used by the service instances for logging accesses to the service and/or for enforcing access control policies. In some embodiments, the frontend receives responses to the service requests from the service instances, encapsulates the responses with routing information usable to route the packets through a network substrate of the provider network to the service endpoint, and sends the encapsulated responses on to the network substrate of the provider network to be routed to the service endpoint on the virtual private network.

While embodiments are described that allow customers to establish service endpoints to services implemented in other virtual private networks on the provider network, some embodiments may allow customers to establish service endpoints to services implemented on the provider network that are not implemented in a virtual private network, or to services in which a frontend to the service is implemented in a virtual private network, but the service instances are on the provider network but not in a virtual private network, or are in a different virtual private network. In addition, some embodiments may allow customers to establish service endpoints to services implemented on networks external to the provider network.

While embodiments are generally described in the context of virtual machines executing in virtual networks on a provider network, embodiments may also be applied in virtual network environments in which physical computing devices may be included in virtual networks. For example, a physical computing device may be assigned an IP address in a customer's virtual network, and may include or be coupled to a hardware device (e.g., a network interface card (NIC), or peripheral device) that performs encapsulation and decapsulation of virtual network packets for the computing device. The computing device can thus communicate with other physical or virtual machines on the virtual network, and can also discover and communicate with service endpoints on the virtual network.

Figure 1B:
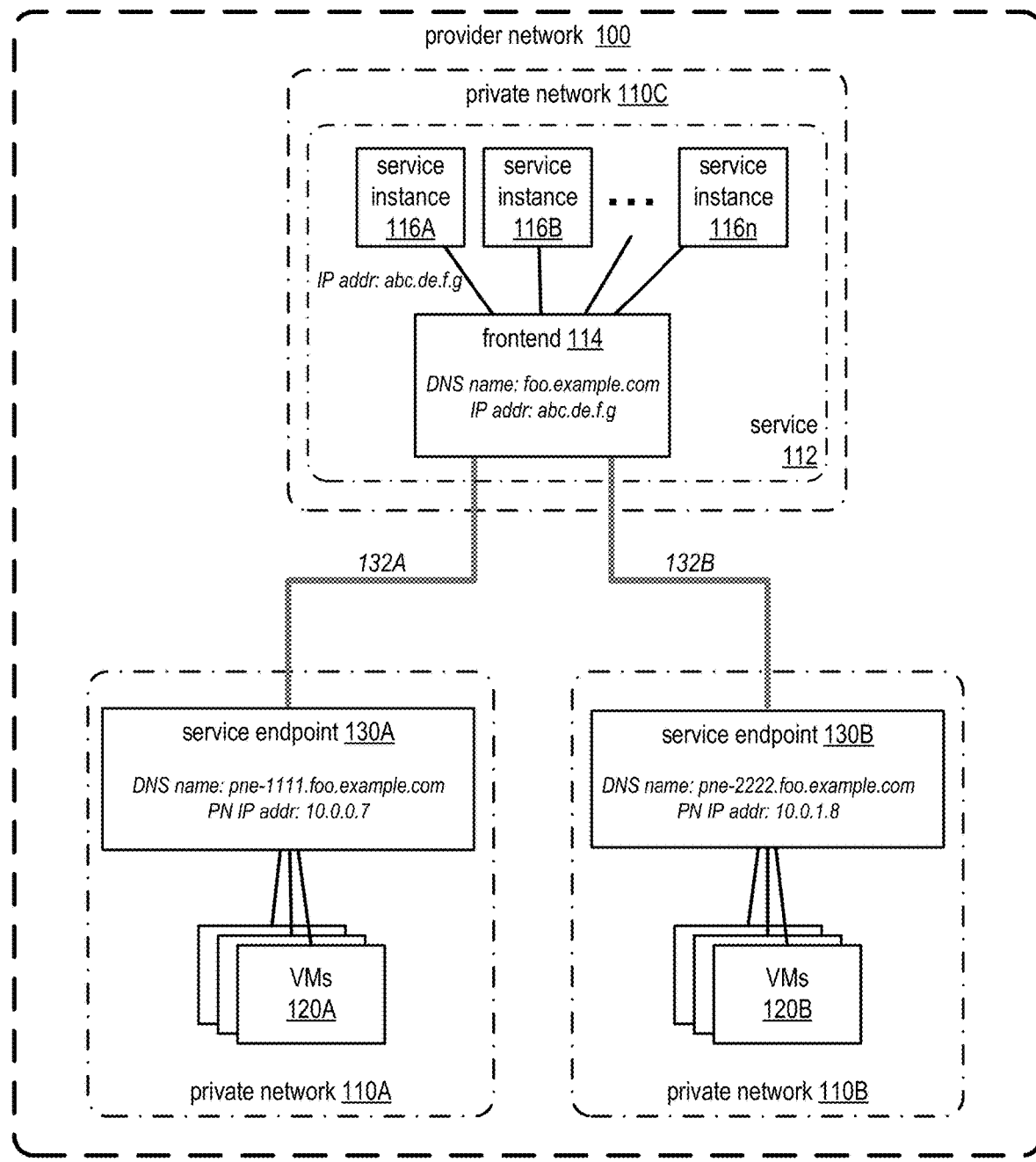
FIG. 1B illustrates embodiments in which service endpoints are assigned unique DNS names in respective customer private networks.
Figure 1C:
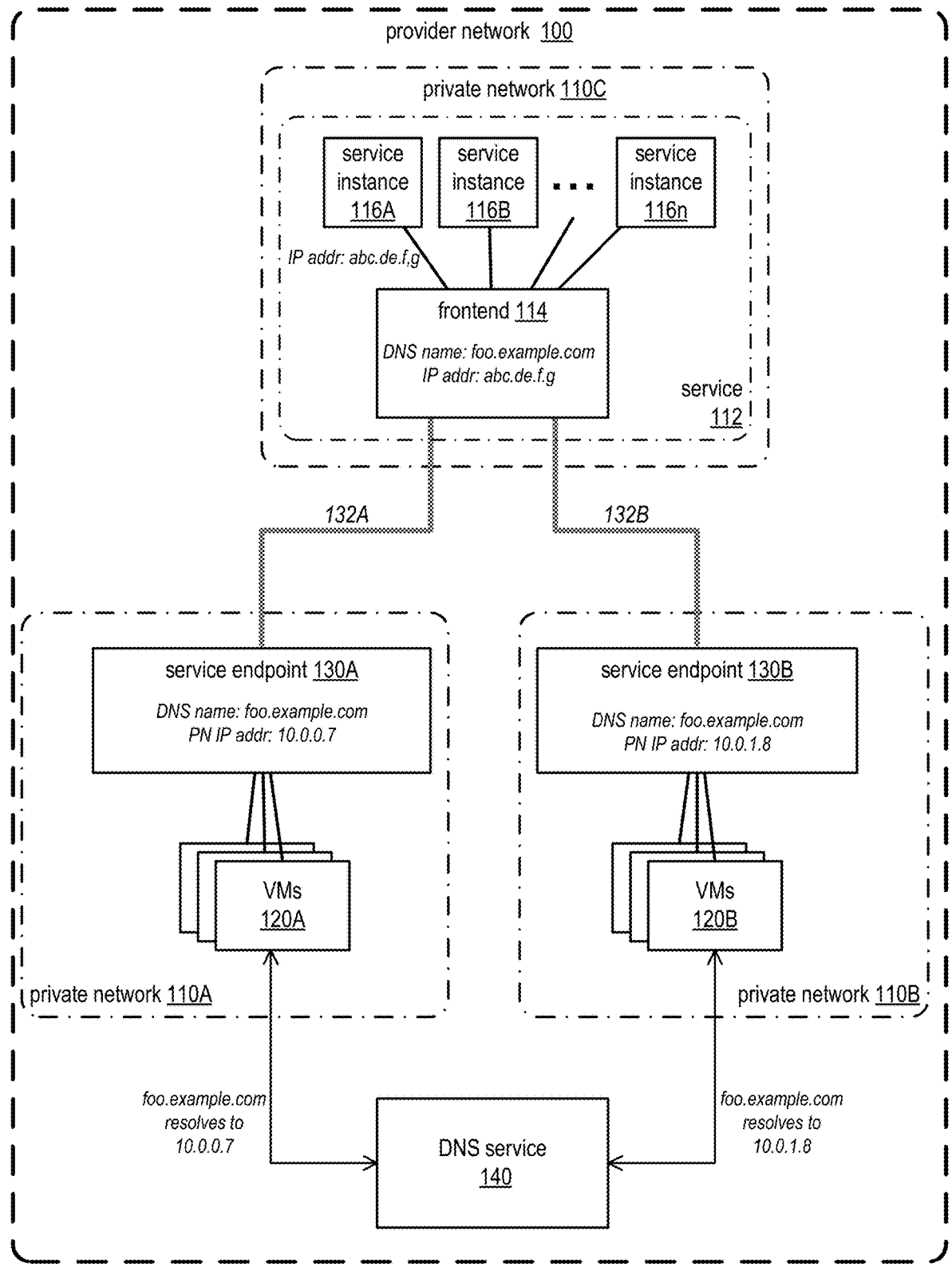
FIG. 1C illustrates embodiments in which service endpoints are assigned the DNS name of the service in respective customer private networks, and shows that the DNS name is resolved to the service endpoints in the respective customer private networks.

FIGS. 1A through 1C illustrate service endpoints to a service hosted on a private network in a provider network, according to some embodiments. FIGS. 1A through 1C provide a non-limiting example in which a service 112 is implemented as one or more service instances 116 behind a frontend 114 (e.g., a virtualized load balancer) in a service private network 110C on the provider network 100. However, note that a service 112 does not necessarily include a frontend 114. Further, a service 112 may be implemented on the provider network 100 that is not in a virtual private network 110. Further, a service 112 may be implemented in which a frontend 114 to the service 112 is implemented in a virtual private network 110 and the service instances 116 are on the provider network 100 but not in a virtual private network 110, or in which the service instances 116 are in a different virtual private network 110 than the frontend 114. Further, in some embodiments, a customer may establish service endpoints to services 112 implemented on networks external to the provider network 100, for example service owner 190 network.

FIG. 1A illustrates an example service in a service private network on a provider network with service endpoints in customer private networks, according to some embodiments. Service 112 may include one or more service instances 116A-116n implemented as virtual machines on private network 110C. Service instances 116A-116n may be fronted by a frontend 114 (e.g., a virtualized load balancer). The frontend 114 may be assigned a public or private IP address. Service 112 may expose a domain name service (DNS) name, by way of example "foo.example.com". Service 112 may be owned or managed by a service owner, represented in FIG. 1A by the service owner's network 190.

Customers (including but not limited to the service owner) may provision and manage private networks 110 on provider network 100 from external networks over an intermediate network 180 such as the Internet via one or more APIs 106 to a control plane 104 of the provider network 100. For example, customers may manage their private networks 100 from graphical user interfaces (GUIs) and/or command line interfaces (CLIs) from consoles in respective external networks 192.

In some embodiments, the service owner may establish and register service 112 with the provider network 100, for example via an API 106 to control plane 104 via a console in service owner network 190 as illustrated in FIG. 11. The control plane 104 may receive, via the API, a request to register the service 112 that specifies an IP address of the service 112 and the DNS name associated with the service 112. In some embodiments, the service 112 may be registered with a catalog service of the provider network 100; services registered with the catalog service may be discovered by customers of the provider network through an API to the catalog service.

A customer may request that a service endpoint 130 for service 112 be established in their virtual private network 110 on the provider network 100, for example via an API 106 to the control plane 104 of the provider network 100 as illustrated in FIG. 12. In some embodiments, the service owner may be informed of the request, and may accept or reject the request, for example via a user interface to the API 106 as illustrated in FIG. 11. If the request is accepted, a service endpoint 130 for the service 112 is generated in the customer's virtual private network 110, the service endpoint 112 is assigned a local IP address in a private IP address range of the customer's virtual private network 110, and a DNS name is assigned to the service endpoint 130. FIG. 1A shows two example virtual private networks 110 with service endpoints 130 to service 112: private network 110A with service endpoint 130A that includes virtual machines (VMs) 120A, owned by a first customer (represented in FIG. 1A by customer network 192A), and private network 110B with service endpoint 130B that includes virtual machines (VMs) 120B, owned by a second customer (represented in FIG. 1A by customer network 192B). In some embodiments, the DNS name for a service endpoint 130 is generated and assigned by the control plane 104, for example as illustrated in FIG. 1B or FIG. 1C. The local IP address for a service endpoint 130 may be specified by the customer, or alternatively may be selected (randomly or otherwise) by the control plane 104 from the private IP address range of the respective private network 110.

In some embodiments, service endpoints 130 may be implemented as records in a data structure (e.g., in a database or file) that map the local IP addresses of the service endpoints 130 to the IP addresses of respective services 112. Software executing in the hypervisor or in a privileged domain on host devices present the service endpoints 130 to VMs 120 executing on the host devices. When a VM 120 sends a service request to the local IP address of a service endpoint 130, the software on the host device maps the local IP address to the IP address of the service 112, encapsulates the service request, and sends the encapsulated request on to the network substrate to be routed to the service 112.

Referring to private network 110A by way of example, VMs 120A in virtual private network 110A may resolve the DNS name assigned to the service endpoint 130A in virtual private network 110A to obtain the local IP address of the service endpoint 130A. The VMs 120A may then send service requests for service 112 to the local IP address of the service endpoint 130A. At the service endpoint 130A, the service requests are encapsulated with routing information usable to route the packets through a network substrate of the provider network 100 to service 112, and the encapsulated service requests are sent on to the network substrate of the provider network 100 to be routed to the service 112 (e.g., to an IP address assigned to the service's frontend 114). The routing of the encapsulated service requests over the network substrate according to the encapsulation information may be viewed as sending the encapsulated service requests via an overlay network route or path 132A (referred to as a "tunnel") over the network substrate.

In some embodiments, the encapsulated service requests sent to the service 112 from service endpoint 130A include information identifying the service endpoint 130A. In some embodiments, the encapsulated service requests may include other information, for example information identifying a customer account associated with the virtual private network 110A, information identifying the VMs 120A that initiated the service requests, and/or authentication and authorization information for the service endpoint 130A and/or for the respective VMs 120A.

At the frontend 114, the encapsulated service requests received from service endpoint 130A are decapsulated and sent or distributed to one or more service instances 116A-116n. In some embodiments, the frontend 114 adds or appends information identifying the service endpoint 130A to the service requests before sending the service requests to the service instances 116A-116n; the added information may, for example, be used by the service 112 for logging accesses to the service and/or for enforcing access control policies. In some embodiments, the frontend 114 receives responses to the service requests from the service instances 116A-116n, encapsulates the responses with routing information usable to route the responses through the network substrate of provider network 100 to the service endpoint 130A, and sends the encapsulated responses on to the network substrate of the provider network 100 to be routed to the service endpoint 130A on virtual private network 110A.

In some embodiments, the provider network 100 may support access to services 112 from external customer networks 192 via service endpoints 130 in the customers' private networks 110 over direct connections 194 between the external networks 192 and the private networks 110. In some embodiments, the provider network 100 may allow a customer to establish a dedicated network connection, referred to as a direct connection 194, from an external customer network 192 to a virtual private network 110 on the provider network 100. A direct connection 194 may be a private communications channel, and may provide secure communications and higher bandwidth throughput than is available over an Internet-based connection. FIG. 1A shows a direct connection 194 from customer network 192A to private network 110A. In some embodiments, resources on customer network 192A may discover the DNS name assigned to service endpoint 130A on private network 110A, resolve the DNS name to obtain the local IP address of the service endpoint 130A, and send service requests for service 112 to the local IP address of the service endpoint 130A over direct connection 194. At the service endpoint 130A, the service requests are encapsulated with routing information usable to route the packets through a network substrate of the provider network 100 to service 112, and the encapsulated service requests are sent on to the network substrate of the provider network 100 to be routed to the service 112 (e.g., to an IP address assigned to the service's frontend 114). The service endpoint 130A may send responses to the service requests to the customer network 192A over direct connection 194.

In some embodiments, a customer may define and assign policies 134 to endpoints on their private networks 110. An endpoint policy 134 may, for example, control access to an endpoint on the private network 110 (i.e., a local IP address of the private network) by specifying IP addresses, ranges of IP addresses, subnets, and/or security groups that are allowed to access the endpoint, and/or by specifying IP addresses, ranges of IP addresses, subnets, and/or security groups that are not allowed to access the endpoint. An endpoint policy 134 may include other access control restrictions for an endpoint, for example by specifying time windows when particular IP addresses or ranges can or cannot access the endpoint, specifying throughput limits for particular IP addresses or ranges, specifying particular operations (e.g., service requests) that particular IP addresses or ranges are allowed to perform or are not allowed to perform through the endpoint, and so on. FIG. 1A shows an endpoint policy 134 for service endpoint 130A. When the service endpoint 130A receives a service request from an endpoint (e.g., a VM 120 on private network 110 or a resource on customer network 192A), the service endpoint 130A may check the endpoint policy 134 to determine if the requesting resource is allowed to access the service 112 through service endpoint 130A, and/or if the requesting resource is allowed to make the specific service request to the service 112.

While not shown in FIG. 1A, endpoint policies may also be defined for and associated with service instances 116 in private network 110C. Service requests received from service endpoint 130A by the service instances 116 may include metadata identifying the service endpoint 130A, and may also include information identifying the source endpoints of the service requests. When a service instance 116 receives a service request from frontend 114, the service instance 116 may check its endpoint policy to determine if the service endpoint 130A is allowed to access the service 112, if the source endpoint is allowed to access the service 112 through service endpoint 130A, and/or if the source endpoint is allowed to make the specific service request to the service 112.

FIG. 1A shows two service endpoints 130 to service 112 in two virtual networks 110, with one service endpoint 130 in each virtual network 110. However, embodiments may support any number of service endpoints 130 to a service 112. Further, a virtual network 110 may include more than one service endpoint 130 to a given service 112, and may include service endpoints 130 to more than one service 112.

In some embodiments, service endpoints 112 in customer private networks 110 on the provider network 100 may be assigned a DNS name that is locally (within the private network) and globally (within all private networks) unique. FIG. 1B illustrates embodiments in which service endpoints 130 in virtual networks 110 as illustrated in FIG. 1A are assigned unique DNS names. The DNS names, formats of the DNS names, and IP addresses are given by way of example, and are not intended to be limiting.

In FIG. 1B, the service owner has registered service 112 in service private network 110C with DNS name "foo.example.com" and IP address "abc.de.fg" (assigned to frontend 114, for example a virtualized load balancer). Customers may request service endpoints 130 for service 112 be established in their virtual networks 110 on the provider network 100, for example via an API 106 to the control plane 104 of the provider network 100 as illustrated in FIG. 12. In some embodiments, the service owner may be informed of a request, and may accept or reject the request, for example via a user interface to the API 106 as illustrated in FIG. 11. If the request is accepted, a service endpoint 130 for the service 112 is generated in the customer's virtual network 110, the service endpoint 112 is assigned a local IP address in an IP address range of the customer's virtual network 110, and a DNS name is assigned to the service endpoint 130. The local IP address for a service endpoint 130 may be specified by the customer, or alternatively may be selected (randomly or otherwise) by the control plane 104 from the private IP address range of the respective private network 110. In some embodiments as illustrated in FIG. 1B, the control plane generates and assigns a unique DNS name for each service endpoint 130. By way of example, for a service that publishes the DNS name "foo.example.com", a first service endpoint may be assigned a DNS name "pne-0001.foo.example.com", a second service endpoint may be assigned a DNS name "pne-0002.foo.example.com", and so on. Note that any suitable method of assigning unique DNS names to service endpoints may be used in various embodiments. Each unique DNS name resolves to the local IP address assigned to the respective service endpoint 130.

In FIG. 1B, a service endpoint 130A has been created in customer private network 110A. Service endpoint 130A is assigned a local IP address (10.0.0.7, in this example) in the private IP address range of private network 110A. Service endpoint 130A is associated with a DNS name for the service 112 on private network 110A (in this example, pne-1111.foo.example.com). VMs 120A on private network 110A may resolve the DNS name pne-1111.foo.example.com to obtain the local IP address (10.0.0.7, in this example) of service endpoint 110A. VMs 120A may then send service requests for service 112 to the service endpoint 130A at the local IP address (10.0.0.7) on private network 110A. At the service endpoint 130A, the service requests are encapsulated with routing information usable to route the encapsulated packets over the network substrate to the IP address assigned to frontend 114, and the encapsulated service requests are sent on to the network substrate of provider network 100 to be routed to the service 112 (e.g., to an IP address assigned to the service's frontend 114). The routing of the encapsulated service requests over the network substrate according to the encapsulation information may be viewed as sending the encapsulated service requests via an overlay network route or path 132A over the network substrate.

In FIG. 1B, another service endpoint 130B has been created in customer private network 110B. Service endpoint 130B is assigned a local IP address (10.0.1.8, in this example) in the private IP address range of private network 110B. Service endpoint 130B is associated with a DNS name for the service 112 on private network 110B (in this example, pne-2222.foo.example.com). VMs 120B on private network 110B may resolve the DNS name pne-2222.foo.example.com to obtain the local IP address (10.0.1.8, in this example) of service endpoint 110B. VMs 120B may then send service requests for service 112 to the service endpoint 130B at the local IP address (10.0.1.8) on private network 110B. At the service endpoint 130B, the service requests are encapsulated with routing information usable to route the encapsulated packets over the network substrate to the IP address assigned to frontend 114, and the encapsulated service requests are sent on to the network substrate of provider network 100 to be routed to the service 112 (e.g., to an IP address assigned to the service's frontend 114). The routing of the encapsulated service requests over the network substrate according to the encapsulation information may be viewed as sending the encapsulated service requests via an overlay network route or path 132 over the network substrate.

At the frontend 114, the encapsulated service requests received from service endpoints 130A and 130B are decapsulated and sent or distributed to one or more service instances 116A-116n. To the service instances 116A-116n, the service requests appear to be coming from the IP address of the frontend 114. However, so that the instances 116A-116n can identify the originating endpoints of the service requests, in some embodiments, the frontend 114 adds or appends information identifying the respective service endpoint 130A or 130B to the service requests before sending the service requests to the service instances 116A-116n. The added information may, for example, be used by the service 112 for logging accesses to the service and/or for enforcing access control policies. In some embodiments, the frontend 114 receives responses to the service requests from the service instances 116A-116n, encapsulates the responses with routing information usable to route the responses through the network substrate of provider network 100 to the respective service endpoint 130A or 130B, and sends the encapsulated responses on to the network substrate of the provider network 100 to be routed to the respective service endpoint 130A on virtual network 110A or service endpoint 130B on virtual network 110B.

In FIG. 1B, in some embodiments, when the service endpoints 130 to service 112 are created in the private networks 110, the unique DNS names assigned to the service endpoints 130 (pne-1111.foo.example.com and pne-2222.foo.example.com, in this example) may be recorded in a DNS service along with information identifying the respective service endpoints 130. When a VM 120 in a private network 110 calls the DNS service to resolve the DNS name of the service endpoint 130 in the private network 110, the DNS service returns the local IP address of the service endpoint 130 on the private network 110. The DNS service may be on provider network 100. In some embodiments the VMs 120 in the different private networks 110A and 110B may call different DNS services. In some embodiments, a virtual network 110 may include a local DNS service instance that the VMs in the virtual network 110 call to resolve DNS names.

In some embodiments, instead of a VM 120 directly calling a DNS service to resolve the DNS name of a service endpoint 130, the VM may query a DNS resolver, for example executing in the hypervisor or in a privileged domain on the host device. The DNS resolver may maintain a cache of DNS entries. When the DNS resolver receives a DNS query from a VM 120, the DNS resolver checks its cache of DNS entries to resolve the query to the local IP address of the respective service endpoint; if the DNS name is not in the cache, the DNS resolver may call a DNS service to resolve the query.

In some embodiments, service endpoints 130 to a service 112 in customer private networks 110 on the provider network 100 may be assigned the same DNS name, which may be the same DNS name as the service 112 DNS name or a different DNS name than the service 112 DNS name (e.g., "foo.example.com" or "com.example.foo" for a service 112 that publishes the DNS name "foo.example.com"). When a VM 120 in a private network 110 invokes the DNS name of the service endpoint 110 in the private network 110, the DNS name resolves to the local IP address assigned to the service endpoint 130 in the respective customer private network 110. FIG. 1C illustrates embodiments in which service endpoints 130 in virtual networks 110 as illustrated in FIG. 1A are assigned the same DNS name for a service 112 in their respective private networks 110, and shows that the DNS name is resolved to the service endpoints 130 in the respective private networks 110. The DNS names and IP addresses are given by way of example, and are not intended to be limiting.

In FIG. 1C, the service owner has registered service 112 in service private network 110C with DNS name "foo.example.com" and IP address "abc.de.fg" (assigned to frontend 114, for example a virtualized load balancer). Customers may request service endpoints 130 for service 112 be established in their virtual networks 110 on the provider network 100, for example via an API 106 to the control plane 104 of the provider network 100 as illustrated in FIG. 12. In some embodiments, the service owner may be informed of a request, and may accept or reject the request, for example via a user interface to the API 106 as illustrated in FIG. 11. If the request is accepted, a service endpoint 130 for the service 112 is generated in the customer's virtual network 110, the service endpoint 112 is assigned a local IP address in an IP address range of the customer's virtual network 110, and a DNS name is assigned to the service endpoint 130. The local IP address for a service endpoint 130 may be specified by the customer, or alternatively may be selected (randomly or otherwise) by the control plane 104 from the private IP address range of the respective private network 110. In some embodiments as illustrated in FIG. 1C, the control plane assigns the same DNS name to each service endpoint 130. By way of example, for a service that publishes the DNS name "foo.example.com", the service endpoints 130 may be assigned the DNS name foo.example.com". Note that, in some embodiments, the DNS name assigned to the service endpoints 130 may be different than the DNS name of the service, for example "com.example.foo" for a service that publishes the DNS name "foo.example.com".

In FIG. 1C, a service endpoint 130A has been created in customer private network 110A. Service endpoint 130A is assigned a local IP address (10.0.0.7, in this example) in the private IP address range of private network 110A. Service endpoint 130A is associated with a DNS name for the service 112 on private network 110A (in this example, foo.example.com). VMs 120A on private network 110A may resolve the DNS name foo.example.com to obtain the local IP address (10.0.0.7, in this example) of service endpoint 110A, for example by calling a DNS service 140 on provider network 100. VMs 120A may then send service requests for service 112 to the service endpoint 130A at the local IP address (10.0.0.7) on private network 110A. At the service endpoint 130A, the service requests are encapsulated with routing information usable to route the encapsulated packets over the network substrate to the IP address assigned to frontend 114, and the encapsulated service requests are sent on to the network substrate of provider network 100 to be routed to the service 112 (e.g., to an IP address assigned to the service's frontend 114). The routing of the encapsulated service requests over the network substrate according to the encapsulation information may be viewed as sending the encapsulated service requests via an overlay network route or path 132A over the network substrate.

In FIG. 1C, another service endpoint 130B has been created in customer private network 110B. Service endpoint 130B is assigned a local IP address (10.0.1.8, in this example) in the private IP address range of private network 110B. Service endpoint 130B is associated with a DNS name for the service 112 on private network 110B which is the same as the DNS name associated with the service endpoint 130A on private network 110A (in this example, foo.example.com). VMs 120B on private network 110B may resolve the DNS name foo.example.com to obtain the local IP address (10.0.1.8, in this example) of service endpoint 110B, for example by calling DNS service 140 on provider network 100. VMs 120B may then send service requests for service 112 to the service endpoint 130B at the local IP address (10.0.1.8) on private network 110B. At the service endpoint 130B, the service requests are encapsulated with routing information usable to route the encapsulated packets over the network substrate to the IP address assigned to frontend 114, and the encapsulated service requests are sent on to the network substrate of provider network 100 to be routed to the service 112 (e.g., to an IP address assigned to the service's frontend 114). The routing of the encapsulated service requests over the network substrate according to the encapsulation information may be viewed as sending the encapsulated service requests via an overlay network route or path 132 over the network substrate.

At the frontend 114, the encapsulated service requests received from service endpoints 130A and 130B are decapsulated and sent or distributed to one or more service instances 116A-116n. To the service instances 116A-116n, the service requests appear to be coming from the IP address of the frontend 114. However, so that the instances 116A-116n can identify the originating endpoints of the service requests, in some embodiments, the frontend 114 adds or appends information identifying the respective service endpoint 130A or 130B to the service requests before sending the service requests to the service instances 116A-116n. The added information may, for example, be used by the service 112 for logging accesses to the service and/or for enforcing access control policies. In some embodiments, the frontend 114 receives responses to the service requests from the service instances 116A-116n, encapsulates the responses with routing information usable to route the responses through the network substrate of provider network 100 to the respective service endpoint 130A or 130B, and sends the encapsulated responses on to the network substrate of the provider network 100 to be routed to the respective service endpoint 130A on virtual network 110A or service endpoint 130B on virtual network 110B.

In FIG. 1C, in some embodiments, when the service endpoints 130 to service 112 are created in the virtual networks 110, the DNS name assigned to the service endpoints 130 (foo.example.com, in this example) may be recorded in DNS service 140 along with information identifying the respective private networks 110 and/or the respective service endpoints 130. When a VM 120 in a private network 110 calls the DNS service 140 to resolve the DNS name of the service endpoint 130 in the virtual network 110, information identifying the virtual network 110 and/or the service endpoint 130 is included with the call. The DNS service 140 can then use this information to resolve the DNS name to the correct service endpoint 130 and return the local IP address of the service endpoint 130 in the virtual network 110.

While FIG. 1C shows a DNS service 140 on provider network 100 that is called by VMs 120 in both virtual networks 110A and 110B, in some embodiments the VMs 120 in the different virtual networks 110A and 110B may call different DNS services 140. Further, in some embodiments, a virtual network 110 may include a local DNS service 140 instance that the VMs in the virtual network 110 call to resolve DNS names.

In some embodiments, instead of a VM 120 directly calling a DNS service 140 to resolve the DNS name of a service endpoint 130, the VM may query a DNS resolver, for example executing in the hypervisor or in a privileged domain on the host device. The DNS resolver may maintain a cache of DNS entries. When the DNS resolver receives a DNS query from a VM 120, the DNS resolver checks its cache of DNS entries to resolve the query to the local IP address of the respective service endpoint; if the DNS name is not in the cache, the DNS resolver may call a DNS service 140 to resolve the query.

Figure 2:
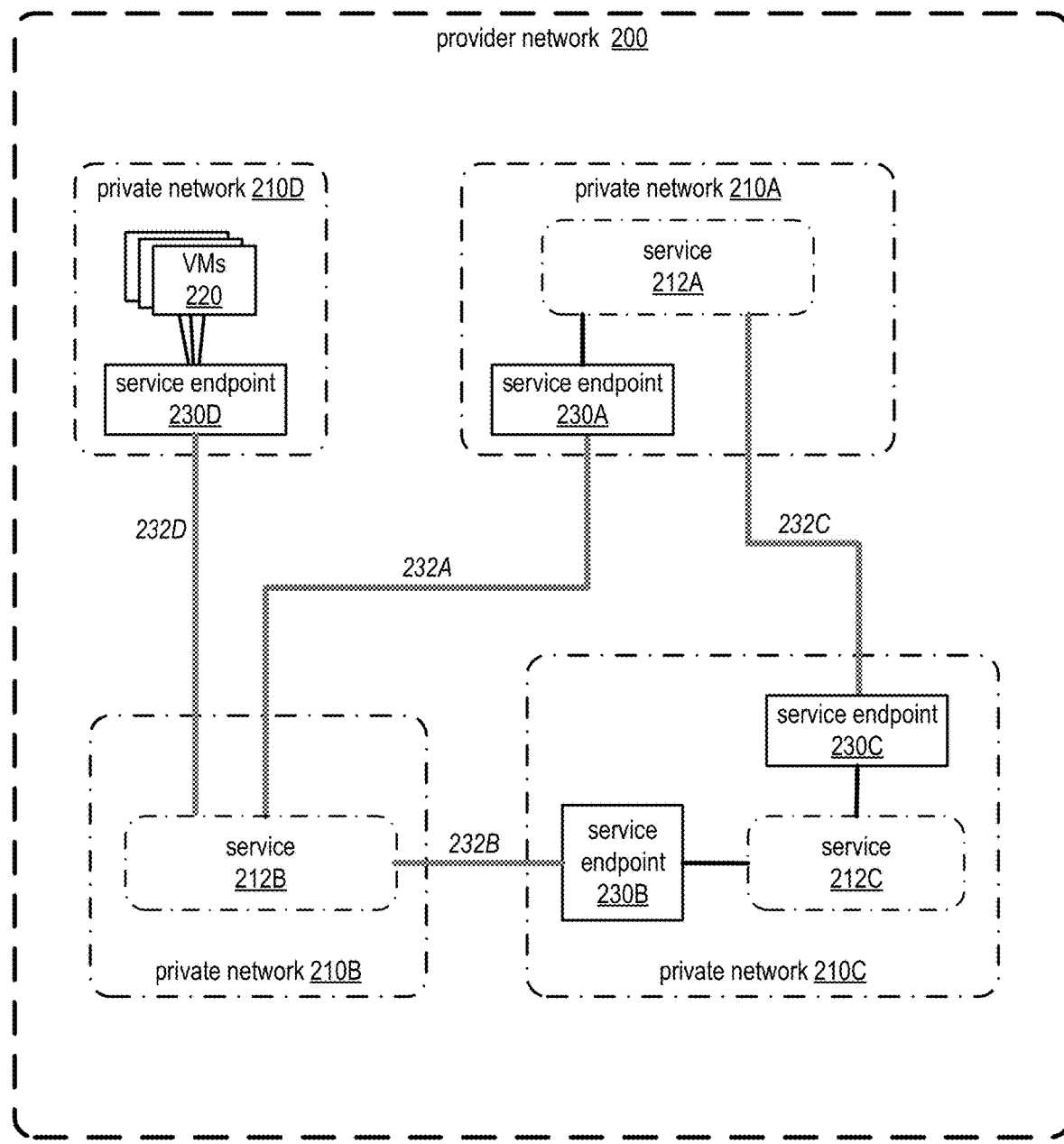
FIG. 2 illustrates multiple private networks hosting services with endpoints to the services in other private networks, according to some embodiments.

FIG. 2 illustrates multiple private networks hosting services with endpoints to the services in other private networks, according to some embodiments. In FIG. 2, as a non-limiting example, private network 210A implements service 212A, private network 210B implements service 212B, and private network 210C implements service 212C. Service endpoints 230 to the various services 212 may be implemented in various private networks 212 on provider network 200. Through service endpoints 230 to a service 212, VMs 220 and services 230 in other private networks 210 can access the service 212. For example, as shown in FIG. 2, private network 210A includes a service endpoint 230A to service 212B, private network 210C includes a service endpoint 230B to service 212B and a service endpoint 230C to service 212A, and private network 210D includes a service endpoint 230D to service 212B. Service 212A may access service 212B through service endpoint 230A and over path 232A, service 212C may access service 212B through service endpoint 230B and over path 232B, and service 212C may access service 212A through service endpoint 230B and over path 232B. VMs 220 in private network 210D may access service 212B through service endpoint 230D and over path 232D.

As an example use case, an entity (e.g., a business or other organization) may want to compartmentalize their provider network 100 implementation, for example according to departments, functionalities, projects, or other groupings, by providing a separate virtual network 210 for at least some of the groups. Large entities may thus implement many separate virtual networks 210, anywhere from tens to thousands of private networks 210, on provider network. However, a virtual network 210 in an entity's provider network 200 implementation may implement a service or services that may need to be accessed by resources (e.g., VMs or other services) in other virtual networks 210 of the entity's provider network 200 implementation. Conventionally, to access a service implemented on a private network 210 from another private network, service requests are routed over the public Internet to the service's endpoint. In some embodiments, as an alternative, the entity can establish peerings between private networks 210 in their implementation via which services can be accessed. However, as previously described, both of these approaches have shortcomings. Allowing the entity to establish service endpoints 230 in their private networks 210 overcomes shortcomings of the previous approaches, allowing the entity to configure and manage large and complex implementation on the provider network 200 that includes tens, hundreds, or thousands of private networks 210 that implement various services 212, and in which access to the services 212 can be easily provided to resources in other private networks 210 by adding service endpoints 230 in the respective private networks 210. Further, in some embodiments, access to the services 212 can be controlled by endpoint policies for the service endpoints 212 and/or for service instances, and/or by authentication/authorization methods such as certificates or tokens obtained through an authentication/authorization service.

Figure 3:
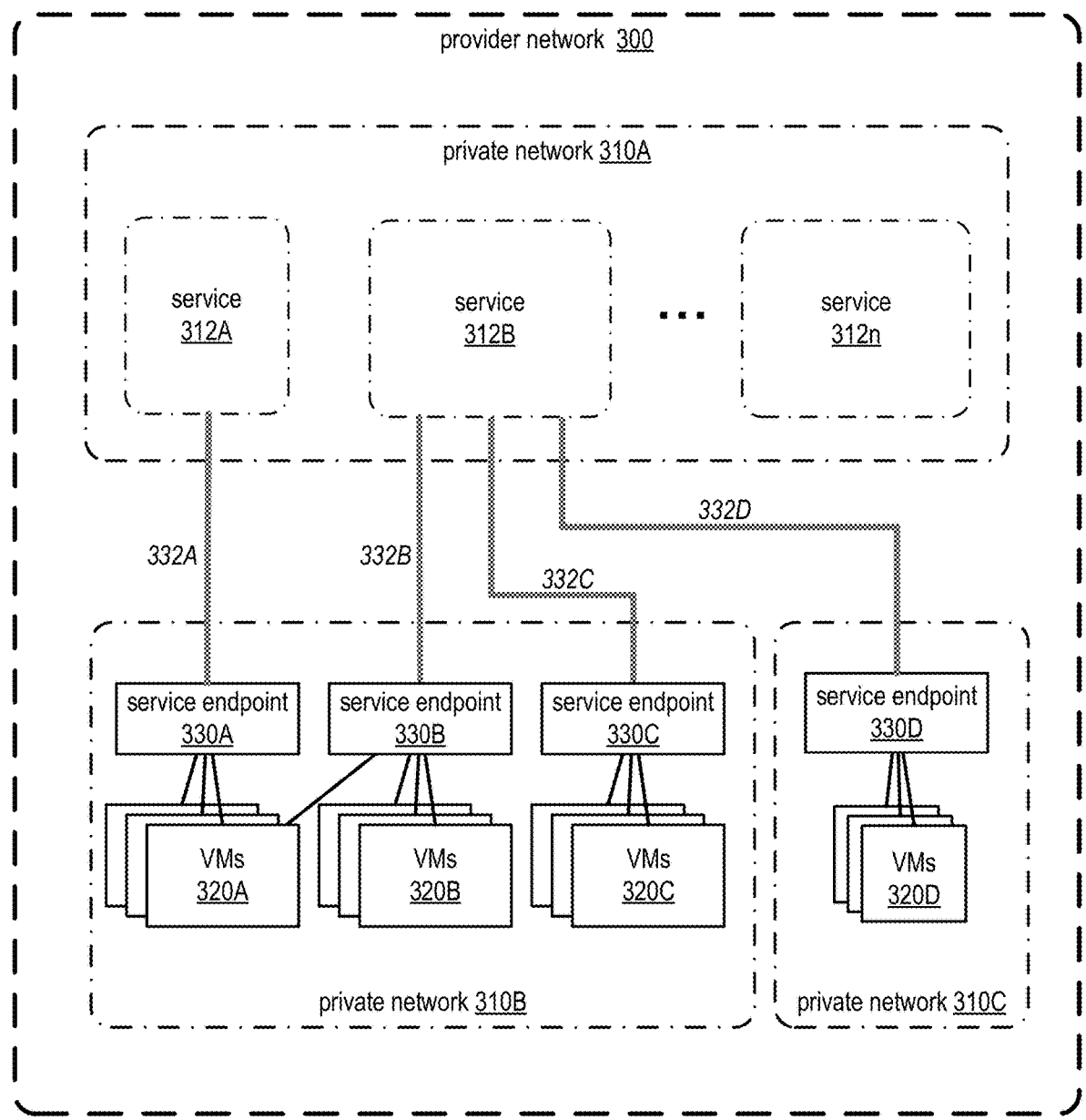
FIG. 3 illustrates a private network hosting multiple services with endpoints in other private networks, according to some embodiments.

FIG. 3 illustrates a private network hosting multiple services with endpoints in other private networks, according to some embodiments. In FIG. 3, as a non-limiting example, private network 310A implements multiple services 312A, 312B . . . 312*n*. Service endpoints 330 to the various services 312 in private network 310A may be implemented in various other private networks 312 on provider network 300. VMs 320 (and services) in other private networks 310 can access the services 312 in private network 310A through service endpoints 330 to the services 312 in the respective private networks 310. For example, as shown in FIG. 3, private network 310B includes a service endpoint 330A to service 312A and two service endpoints 330B and 330C to service 312B, and private network 210C includes a service endpoint 330D to service 312B. VMs 320A in private network 310B may access service 312A through service endpoint 330A and over path 332A, VMs 320B in private network 310B may access service 312B through service endpoint 330B and over path 332B, and VMs 320C in private network 310B may access service 312B through service endpoint 330C and over path 332C. As shown by the line from VMs 320A to service endpoint 320B, a VM 320 in a private network 310 may access more than one service 312 through respective service endpoints 330 in the private network 310. VMs 320D in private network 310C may access service 312B through service endpoint 330D and over path 332D.

Figure 4:
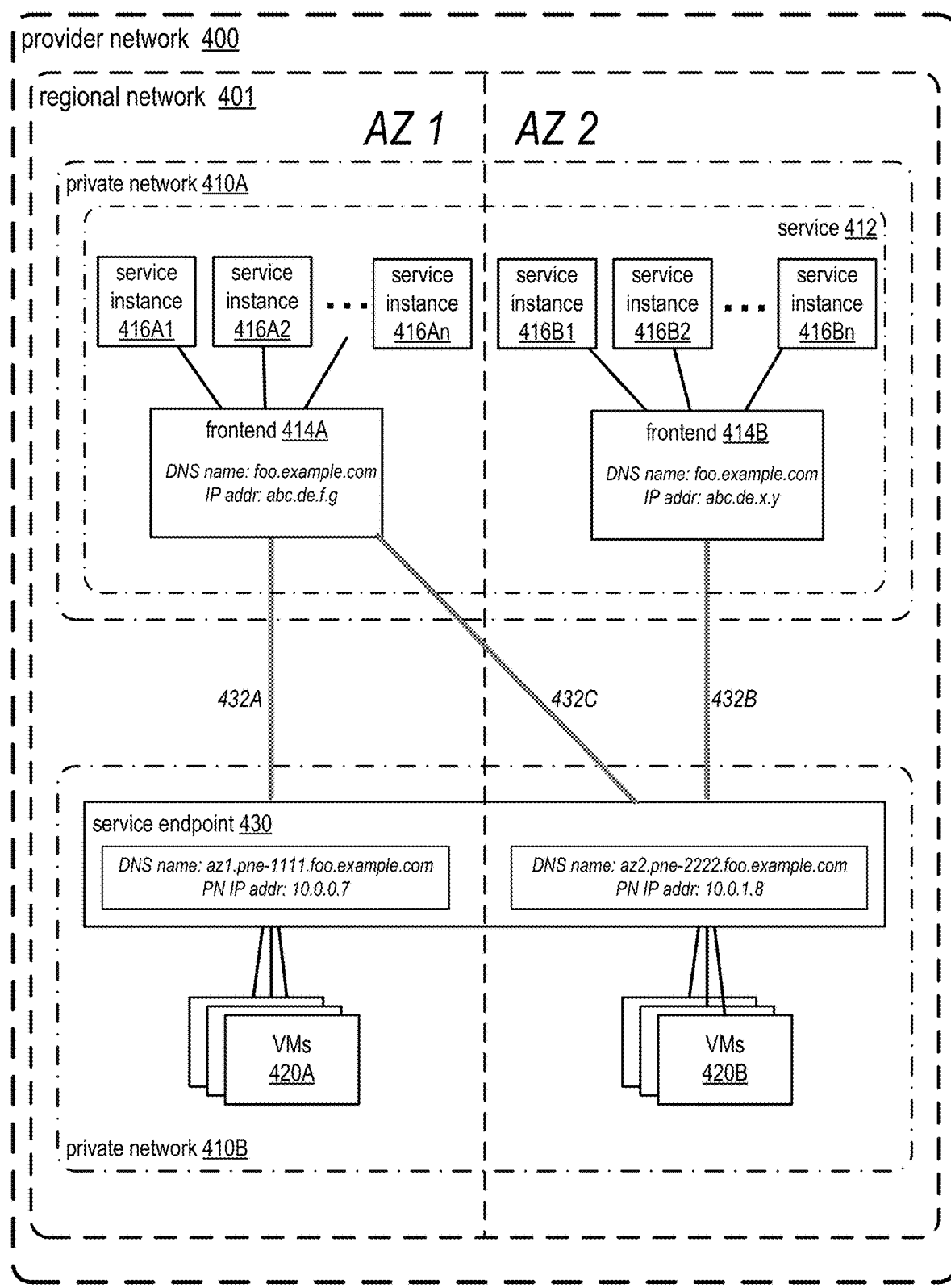
FIG. 4 illustrates service endpoint support for multiple availability zones in a region of a provider network, according to some embodiments.

FIG. 4 illustrates service endpoint support for multiple availability zones in a region of a provider network, according to some embodiments. In some embodiments, a provider network 400 may include one or more regional networks 401; each regional network 401 may include multiple availability zones. For example, in FIG. 4, regional network 401 include two availability zones, AZ1 and AZ2. Each availability zone may be implemented by one or more data centers within the respective regional network 401; a data center may implement one or more availability zones. The availability zones in a regional network 401 may be connected through low-latency links (e.g., dedicated high-bandwidth fiber-optic links) and collectively form the regional network 401. Communications between endpoints (e.g., customers' virtual resources) in different availability zones within a regional network 401 may go over the intermediate network or over the low-latency links. In some embodiments, the provider network 400 may provide replication of a customer's virtual resources across two or more availability zones within a respective regional network 401. By replicating a customer's virtual resources across availability zones within a regional network 401, the customer's virtual resources may remain available in another availability zone in the regional network 401 if one availability zone goes down for some reason. Thus, in some embodiments, as shown in FIG. 4, a service 412 provided by a service private network 410A may be implemented in two or more availability zones (AZ1 and AZ2, in this example) of a regional network 401. Similarly, a customer private network 410B may be implemented in two or more availability zones (AZ1 and AZ2, in this example) of the regional network 401.

FIG. 4 provides a non-limiting example in which a service 412 is implemented by private network 410A in availability zones AZ1 and AZ2 of a regional network 401. Service 412 is implemented in AZ1 as one or more service instances 416A1, 416A1 . . . 416An behind a frontend 414A (e.g., a virtualized load balancer), and in AZ2 as one or more service instances 416B1, 416B1 . . . 416Bn behind a frontend 414B (e.g., a virtualized load balancer). The two instances of the service 412 have the same DNS name (foo.example.com, in this example), but have different IP addresses (abc.de.f.g in AZ1 and abc.de.x.y in AZ2, in this example).

Private network 410B is implemented in availability zones AZ1 and AZ2 of regional network 401. VMs 420A are in AZ1, and VMs 420B are in AZ2. Private network includes a service endpoint 430 to service 412. Service endpoint 430 has different local IP addresses and is assigned different DNS names in the two availability zones: az1.pne-1111.foo-.example.com resolves to local IP addresses: 10.0.0.7 in AZ1, and az2.pne-2222.foo.example.com resolves to 10.0.1.8 in AZ2, in this example. VMs 420A in AZ1 may typically access service 412 at the service IP address in AZ1 (abc.de.f.g, in this example) through service endpoint 430 and path 432A by resolving the AZ1 DNS name (az1.pne-1111.foo.example.com, in this example) to obtain the AZ1 local IP address (10.0.0.7, in this example). VMs 420B in AZ2 may typically access service 412 at the service IP address in AZ2 (abc.de.x.y, in this example) through service endpoint 430 and path 432B by resolving the AZ2 DNS name (az2.pne-2222.foo.example.com, in this example) to obtain the AZ2 local IP address (10.0.1.8). However, as shown by path 432C, a VM 420 in one availability zone may access a service 412 in another availability zone through the service endpoint 430. For example, VMs 420B in AZ2 may access service 412 at the service IP address in AZ1 (abc.de.f.g, in this example) through service endpoint 430 and path 432C (that crosses availability zones) by resolving the AZ1 DNS name (az1.pne-1111.foo.example.com, in this example) to obtain the AZ1 local IP address (10.0.0.7, in this example).

Figure 5:
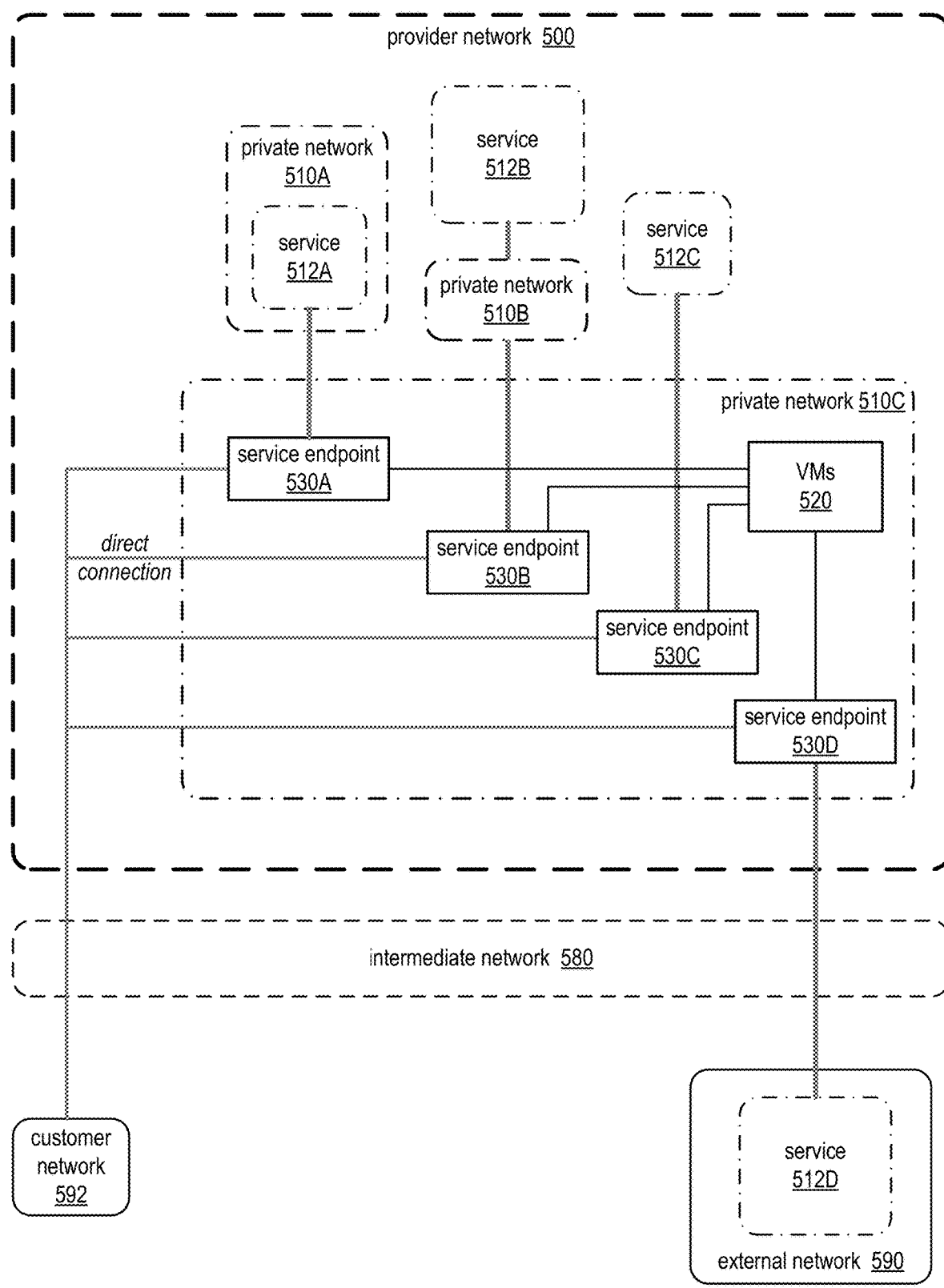
FIG. 5 illustrates a private network with service endpoints to services in different locations, according to some embodiments.

FIG. 5 illustrates a private network with service endpoints to services in different locations, according to some embodiments. While embodiments are described in FIGS. 1A through 4 that allow customers to establish service endpoints in their virtual private networks to services implemented in other virtual private networks on the provider network, some embodiments may allow customers to establish service endpoints in their virtual private networks to services implemented on the provider network that are not implemented in a virtual private network, or to services in which a frontend to the service is implemented in a virtual private network and the service instances are on the provider network but not in a virtual private network or are in a different virtual private network. In addition, some embodiments may allow customers to establish service endpoints to services implemented on networks external to the provider network.

FIG. 5 shows an example private network 510C that includes a service endpoint 530A to a service 512A in another private network 510A. Private network 510C also includes a service endpoint 530B to a service 512B in which the frontend to the service is implemented in a private network 510B, and the service 512B (e.g., the one or more service instances) are implemented outside the private network 510B, either on the provider network 500 or in another virtual private network on the provider network 500. Private network 510C also includes a service endpoint 530C to a service 512C that is implemented as one or more service instances on the provider network 500 but not in a virtual private network. Private network 510C also includes a service endpoint 530D to a service 512D that is implemented on a network 590 external to the provider network 500. VMs 520 on private network 510C may access services 512A-512D through the respective service endpoints 530A-530D in private network 510C. In addition, resources on customer network 592 may access services 512A-512D through a direct connection over intermediate network 580 to the respective service endpoints 530A-530D in private network 510C as illustrated in FIG. 1A.

To send service requests to service 512D on the external network 590, the service requests may be encapsulated at service endpoint 530D with routing information usable to route the packets through a network substrate of the provider network 500 to an edge device of the provider network 500. At the edge device, the service requests may be decapsulated and sent over an intermediate network 580 (e.g., the Internet) to the external network 590. The service requests may be sent over the public Internet, or alternatively may be sent over a private communications channel or direct connection over intermediate network 580 to the external network 590. Responses from service 530D may be received at an edge device of the provider network, encapsulated with routing information usable to route the packets through the network substrate of the provider network 500 to the service endpoint 530D, where the responses are decapsulated and forwarded to the respective endpoint, which may be a VM 520 on the private network 510C or a resource on customer network 592.

Figure 6:
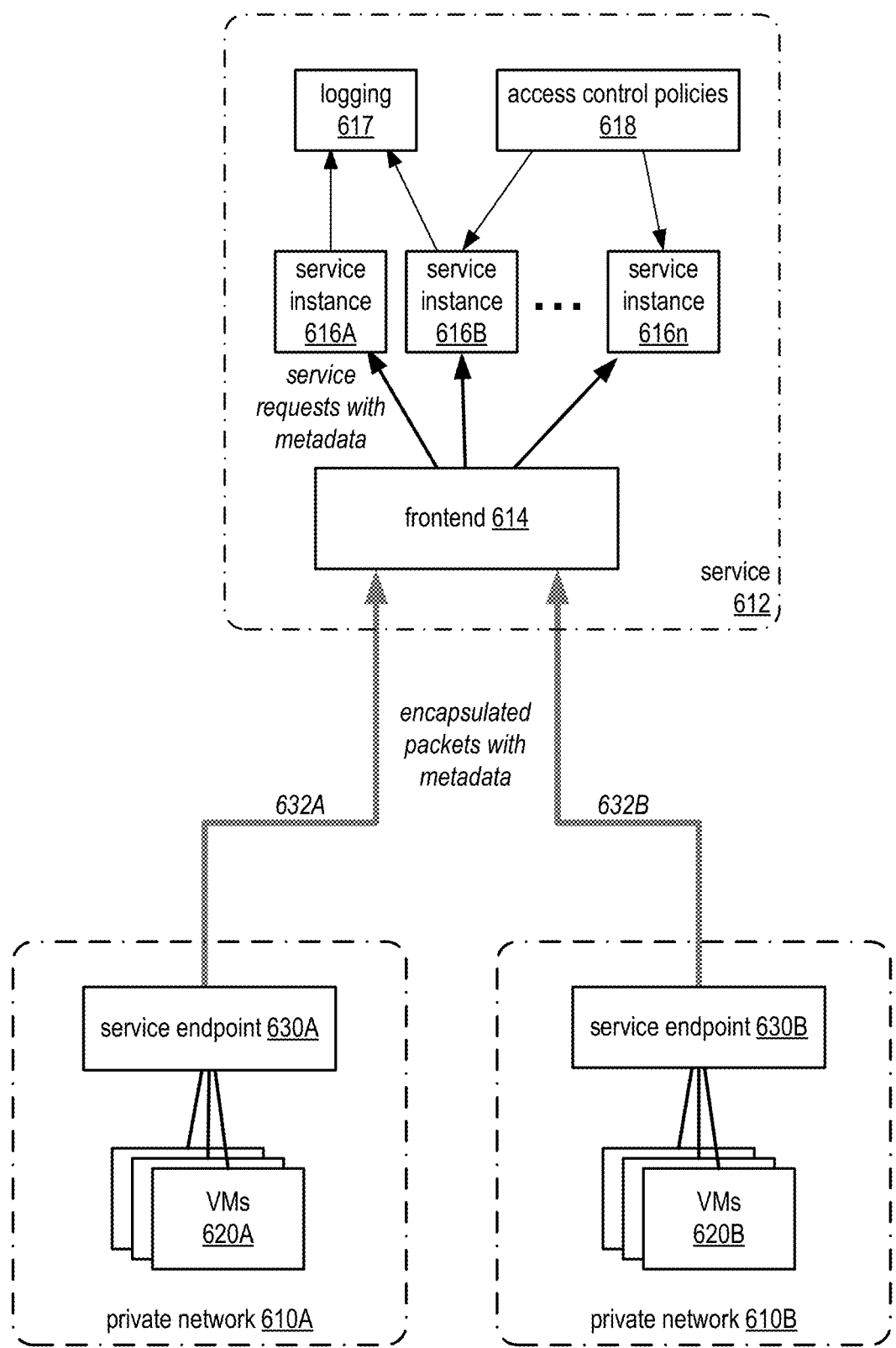
FIG. 6 illustrates example uses for metadata included with service requests, according to some embodiments.
Figure 7:
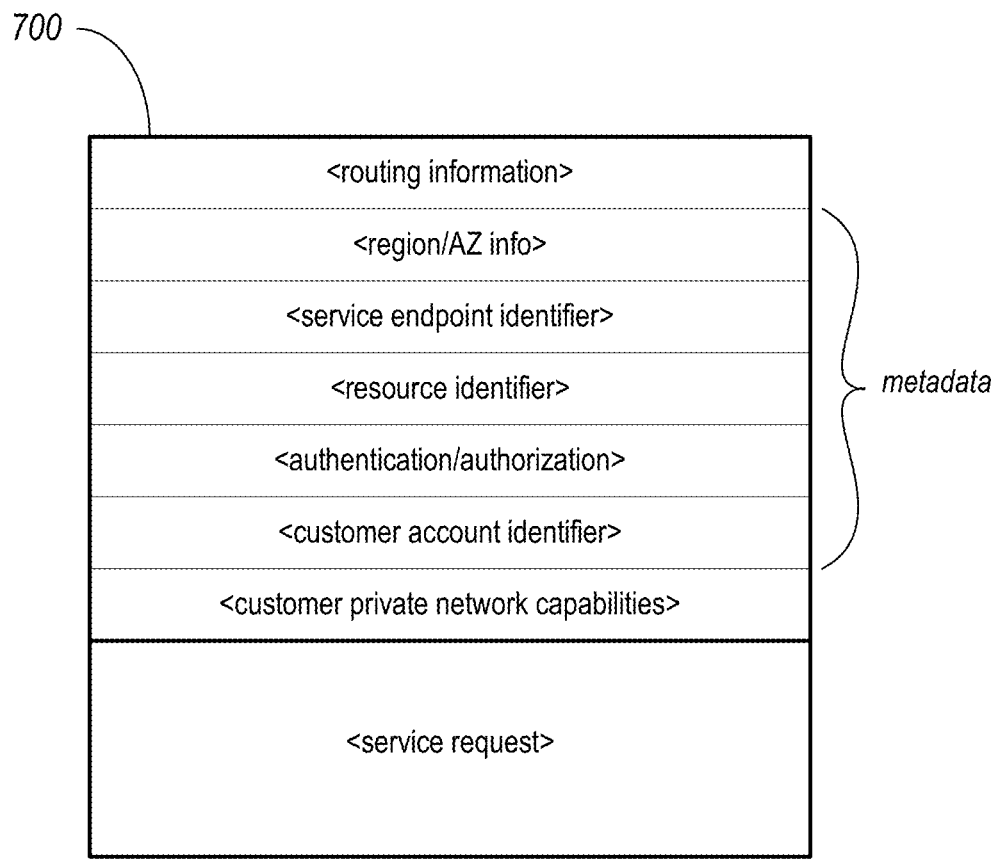
FIG. 7 illustrates example metadata that may be included with a service request, according to some embodiments.

FIG. 6 illustrates example metadata that may be included with service requests, according to some embodiments. In some embodiments, metadata may be included in or with a service request sent in an encapsulation packet by a service endpoint 630 to a service 612. FIG. 7 illustrates example metadata that may be included with a service request, according to some embodiments. As shown in FIG. 7, an encapsulation packet 700 may include routing information (including, but not limited to, source and destination endpoints for the packet) usable to route the packet through a network substrate of the provider network 600 to a target endpoint on the provider network, for example to the IP address of a frontend 614 to service 612. In some embodiments, in addition to the routing information, metadata may be added to the packet. The metadata may include one or more of, but is not limited to:

- Region/AZ information—information identifying a region and/or availability zone of a region on the provider network from which the service request originated.
- Service endpoint identifier—an identifier that uniquely identifies the service endpoint; the service endpoint identifier may also be used to identify the source private network.
- Source endpoint identifier—an identifier that uniquely identifies the endpoint that originated the service request via the service endpoint (e.g., a VM in the source private network).
- Authentication/authorization—information (e.g., a certificate, token, etc.) that may be used to authenticate the originating endpoint (e.g., a VM on the source private network, or a resource on a network external to the source private network), and/or to authorize access to the service by the originating endpoint.
- Customer account identifier—an identifier for a provider network account associated with the originating endpoint (e.g., an account of the owner of the source private network that was used to create the service endpoint).

Customer private network capabilities—information indicating capabilities of the source private network and/or of the source endpoint (e.g., VM on the source private network), for example throughput capabilities, formats and protocols used, etc.

The IP packets (e.g., service requests) that pass between a customer's virtual network 610 and a service 612 include source and destination IP addresses that do not convey the identities of the owners of the virtual network 610 or service 612. However, the service endpoint 630 is established by an authenticated call to an API of the provider network control plane by a provider network account with a strong identity. Information about the account that creates a service endpoint 630 may be recorded, and this information can be used to attribute IP packets passing through the service endpoint 630 to the account that created it, for example by adding the account identifier and/or other account information as metadata to the IP packets. For example, if account A creates service endpoint 630A, the system stores information that allows it to attribute all traffic passing through endpoint 630A to account A, even though the IP packets themselves do not contain any information that identifies the account. Note that the identity of the service owner account is also known when creating a service endpoint 630, and thus information about the service owner account may also be recorded and applied to traffic passing through the service endpoint 630. Knowledge of the accounts on both sides of the connection provided by a service endpoint 630 may allow functionalities to be supported that may not be possible on conventional networks.

The recorded account information for service endpoints 630 can be used for various purposes. For example, the information may be used in metering the amount of data usage by accounts; the metering data may be used in generating usage reports and/or for billing purposes. As another example, traffic shaping can be performed and/or Quality of Service (QoS) rules may be applied based on account identities; for example, account A may be permitted to burst to 100 Mbps, while Account B may be limited to 10 Mbps. As another example, identity-based firewalling may be applied, for example allowing different accounts to send different types of traffic, or restricting certain accounts to particular types of traffic. As another example, all traffic flowing into a private network through a service endpoint 630 may be encrypted using the public part of a specified asymmetric key or certificate; the key or certificate may, for example, be specified by the account owner at the time they call the control plane via the API to create the service endpoint 630.

Referring again to FIG. 6, upon receiving an encapsulation packet 700 from source endpoint 630A on private network 610A or from source endpoint 630B on private network 610B, frontend 614 to service 612 (e.g., a virtualized load balancer) may decapsulate the packet and send the service request to one of service instances 616A-616n of service 612. The frontend may include one or more of the metadata items with the service request. For example, in some embodiments, authentication/authorization information may be included; the service instance 616 may use the authentication/authorization information to authenticate the originating endpoint (e.g., a VM on the source private network 610A or 610B, or a resource on a network external to the source private network), and/or to authorize access to the service by the originating endpoint.

As another example, in some embodiments, a service endpoint identifier may be included that uniquely identifies the service endpoint (in this example, either service endpoint 630A or service endpoint 630B). The service endpoint identifier may, for example, be used by the service instance 616 to check an access control policy 618 to determine if the source service endpoint has access to the service 612.

As another example, in some embodiments, a source endpoint identifier may be included that uniquely identifies the endpoint that originated the service request via the service endpoint (e.g., a VM 620 in private network 610A or 610B). The source endpoint identifier may, for example, be used by the service instance 616 to check an access control policy 618 to determine if the source endpoint has access to the service 612 to perform the service request.

As another example, in some embodiments, a customer account identifier may be included that identifies the provider network account associated with the originating endpoint (e.g., the owner of the source private network 610A or 610B, in this example). The customer account identifier may, for example, be used by the service instance 616 to record the service request to the service 612 from customers' resources, for example using a logging 617 service. One or more other items from the metadata, for example the service endpoint identifier and source endpoint identifier, may also be recorded for the service request. The recorded or logged information may, for example, be used by the service owner for billing purposes. As another example, the logged information may be provided to the service customers for use in tracking or analyzing usage of the service 612 by their resources.

As another example, in some embodiments, information indicating capabilities of the source private network, for example throughput capabilities formats and protocols used, etc., may be included. The private network capabilities may, for example, be used by the service instance 616 to determine how to format, package, and return data to the source private network and source endpoint in response(s) to the service request.

Figure 8:
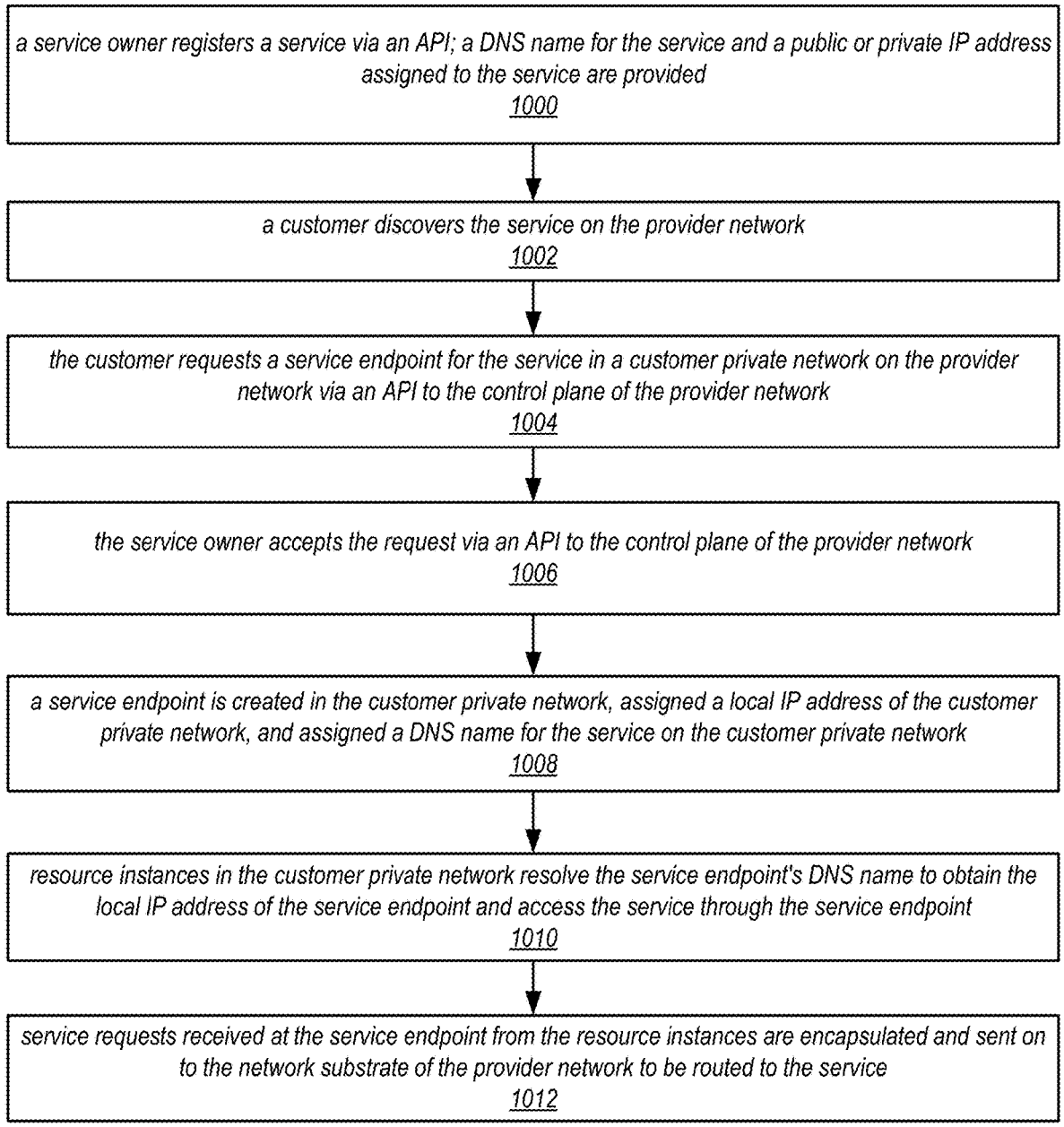
FIG. 8 illustrates a method for providing service endpoints to a service to resources in a private network, according to some embodiments.

FIG. 8 illustrates a method for providing service endpoints to a service to resources in a private network, according to some embodiments. The method of FIG. 8 may, for example, be used in the provider network environments as illustrated in FIGS. 1A through 6.

As indicated at 1000, a service owner may register a service on a provider network via an API, for example as illustrated in FIG. 11. A DNS name for the service and a public or private IP address for the service may be provided by the service owner. The service may, for example, be implemented by one or more service instances in a service private network on the provider network. The service instances may be behind a frontend, such as a virtualized load balancer; the public or private IP address of the service may be assigned to the frontend.

As indicated at 1002, a customer may discover the service on the provider network, for example via an interface to an API as illustrated in FIG. 12. In some embodiments, the service may be registered with a catalog service of the provider network; services registered with the catalog service may be discoverable by customers of the provider network through an API to the catalog service.

As indicated at 1004, the customer requests a service endpoint for the service in a customer private network on the provider network via an API to the control plane of the provider network, for example via an interface to the API as illustrated in FIG. 12. In some embodiments, a service may be implemented in two or more availability zones as illustrated in FIG. 4, and the customer may specify a particular availability zone for the service endpoint to the service.

As indicated at 1006, in some embodiments, the service owner may be informed of the request, and may accept the customer's request, for example via an interface to an API as illustrated in FIG. 11. Note that the service owner may instead choose to reject the request.

As indicated at 1008, upon acceptance of the request, a service endpoint is created in the customer private network. The service endpoint may, for example, be implemented as a virtual network interface in the customer private network. The virtual network interface may be, but is not necessarily, attached to a virtual machine in the customer private network. The service endpoint may be assigned a local IP address in the IP address range of the customer private network, and may be assigned a DNS name for the service that resolves to the respective local IP address assigned to the service endpoint. The service endpoint also records the public or private IP address of the service on the service private network.

In some embodiments as illustrated in FIG. 1C, the DNS name assigned to the service endpoint is the same DNS name (e.g., "foo.example.com" or "com.example.foo" for a service that publishes the DNS name "foo.example.com") assigned to all service endpoints for the service. The service endpoint DNS name resolves to the local IP address assigned to the service endpoint in the customer private network. Alternatively, in some embodiments as illustrated in FIG. 1B, the DNS name assigned to the service endpoint is locally (within the private network) and globally (within all private networks) unique. By way of example, for a service that publishes the DNS name "foo.example.com", the service endpoint may be assigned a DNS name "pne-1234.foo.example.com", where "1234" uniquely identifies the service endpoint.

Figure 9:
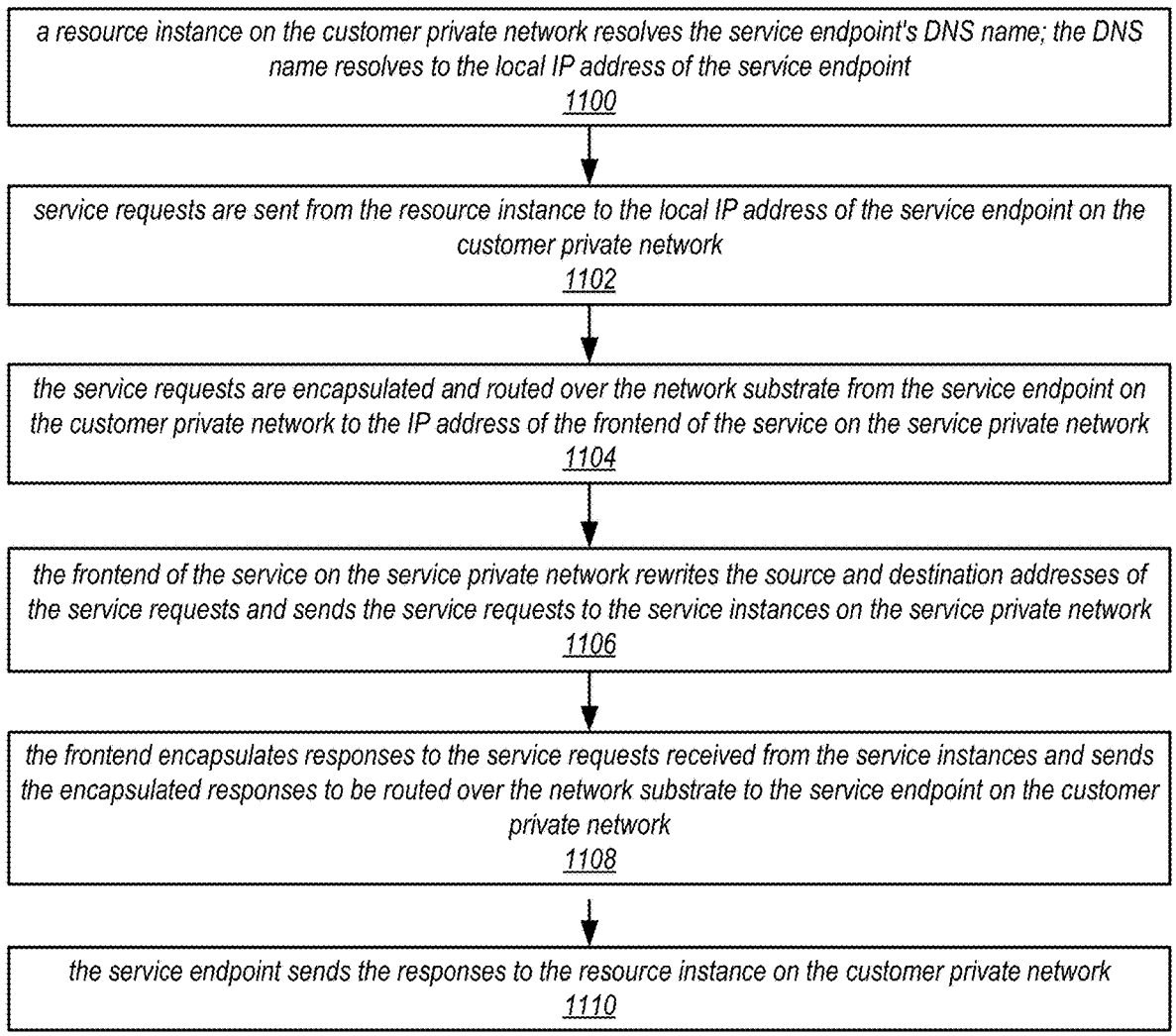
FIG. 9 illustrates a method for accessing a service from a service endpoint in a private network, according to some embodiments.

As indicated at 1010, after the service endpoint is provisioned in the customer private network, resource instance in the customer private network may resolve the service endpoint's DNS name to obtain the local IP address of the service endpoint and access the service through the service endpoint. FIG. 9 illustrates a method for accessing a service from a service endpoint in a private network in more detail. In some embodiments, resources on an external network (e.g., the customer's data center) may also resolve the service endpoint's DNS name to obtain the local IP address of the service endpoint on the customer private network and access the service through a direct connection to the service endpoint as illustrated in FIG. 1A.

As indicated at 1012, service requests received at the service endpoint may be encapsulated with routing information and sent on to the network substrate of the provider network to be routed to the service. The routing of the encapsulation packets over the network substrate according to the routing information may be viewed as sending the encapsulation packets via overlay network routes or paths over the network substrate. At the service, the service requests are decapsulated and sent to a destination endpoint, for example a service instance of the service. In some embodiments, the encapsulated service requests sent to the service from the service endpoint may include metadata, for example information identifying the service endpoint on the customer's virtual private network. In some embodiments, the metadata may include other information, for example information identifying an account of the customer that owns the virtual private network, and/or authentication and authorization information for the service endpoint on the customer's virtual private network. FIG. 7 shows an example encapsulated service request with metadata. In some embodiments, at least some of the metadata may be passed to the service instance(s) with the service requests; the metadata may, for example, be used by the service instances for logging accesses to the service and/or for enforcing access control policies.

FIG. 9 illustrates a method for accessing a service from a service endpoint in a private network, according to some embodiments. FIG. 9 describes an example method in which the service is implemented in a service private network on the provider network, and in which the service has a frontend (e.g., a virtualized load balancer) on the service private network, for example as illustrated in FIGS. 1A through 1C. Note, however, that a service does not necessarily have a frontend, and that a service is not necessarily implemented in a private network on the provider network. FIG. 5 provides examples of different service implementations.

As indicated at 1100, after a service endpoint is provisioned in a customer private network, a resource instance on the customer private network may resolve the service endpoint's DNS name; the DNS name resolves to the local IP address of the service endpoint.

As indicated at 1102, one or more service requests are sent from the resource instance to the local IP address of the service endpoint on the customer private network.

As indicated at 1104, at the service endpoint, the service requests are encapsulated with routing information usable to route the packets through the network substrate of the provider network to the IP address of the frontend of the service on the service private network, and the encapsulated responses are sent on to the network substrate of the provider network to be routed to the frontend of the service. The routing of the encapsulated service requests over the network substrate according to the routing information may be viewed as sending the encapsulated service requests via overlay network routes or paths over the network substrate. In some embodiments, the encapsulated service requests sent to the service from the service endpoint may include metadata, for example information identifying the service endpoint on the customer's virtual private network. In some embodiments, the metadata may include other information, for example information identifying an account of the customer that owns the virtual private network, and/or authentication and authorization information for the service endpoint on the customer's virtual private network. FIG. 7 shows an example encapsulated service request with metadata.

As indicated at 1106, the frontend of the service on the service private network receives the service requests at the IP address of the service, rewrites the source and destination addresses of the service requests, and sends the service requests to the service instances on the service private network. From the perspective of the service instances, rewriting the source and destination addresses causes the service requests to appear to have originated from the frontend. In some embodiments, so that the service instances can identify the original source of the service requests, at least some of the metadata that was included with the encapsulated service requests (for example, information identifying the availability zone, private network, service endpoint, and/or resource instance from which the service request originated) may be passed to the service instances with the service requests; the metadata may, for example, be used by the service instances for logging accesses to the service and/or for enforcing access control policies.

For at least some service requests, the service instances may generate responses to the service requests. As indicated at 1108, the frontend encapsulates the responses with routing information usable to route the packets through a network substrate of the provider network to the service endpoint, and sends the encapsulated responses on to the network substrate of the provider network to be routed to the service endpoint on the customer private network. As indicated at 1110, at the service endpoint, the responses are decapsulated and the service endpoint sends the responses to the resource instance on the customer private network.

Figure 10:
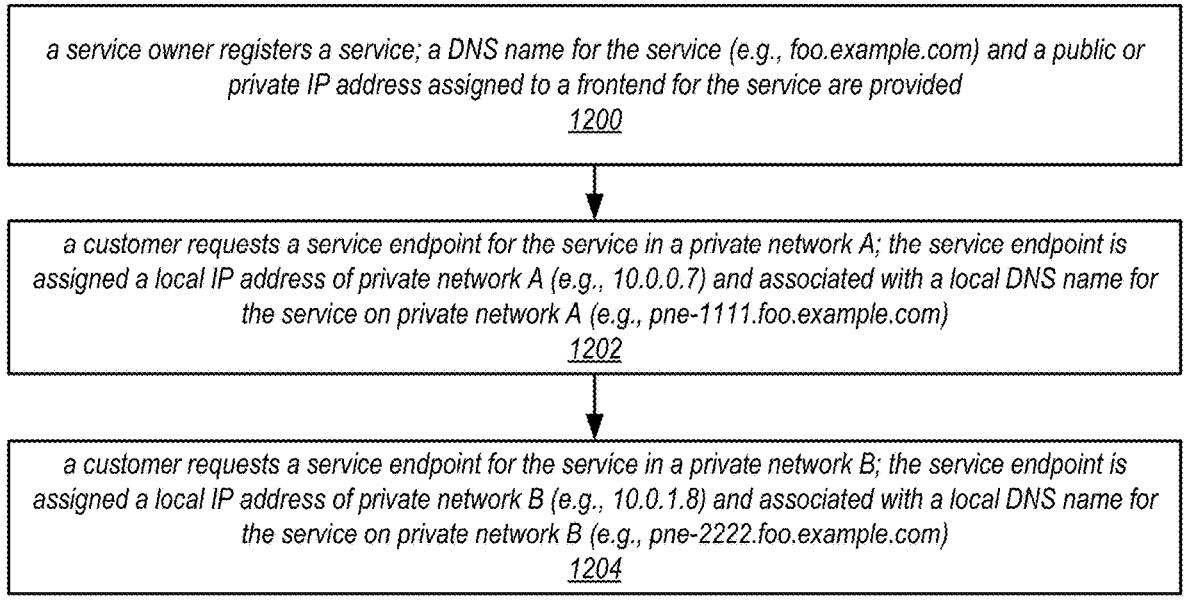
FIG. 10 illustrates a method for providing different DNS names to a service hosted on a private network in other provider networks, according to some embodiments.

In some embodiments, service endpoints in customer private networks on the provider network may be assigned a DNS name that is locally (within the private network) and globally (within all private networks) unique. FIG. 10 illustrates a method for providing different DNS names to a service hosted on a private network in other provider networks, according to some embodiments. The method of FIG. 10 may, for example, be implemented in a provider network environment as illustrated in FIGS. 1A and 1B.

As indicated at 1200, a service owner may register a service on a provider network via an API, for example as illustrated in FIG. 11. A DNS name for the service (e.g., foo.example.com) and a public or private IP address for the service may be provided by the service owner. The service may, for example, be implemented by one or more service instances in a service private network on the provider network. The service instances may be behind a frontend, such as a virtualized load balancer; the public or private IP address of the service may be assigned to the frontend. Customers may discover the service on the provider network, for example via an interface to an API as illustrated in FIG. 12. In some embodiments, the service may be registered with a catalog service of the provider network; services registered with the catalog service may be discoverable by customers of the provider network through an API to the catalog service.

As indicated at 1202, a customer requests a service endpoint for the service in a private network A. The service endpoint is assigned a local IP address in the local IP address range of private network A (e.g., 10.0.0.7) and associated with a DNS name for the service on private network A (e.g., pne-1111.foo.example.com). VMs on private network A may resolve the DNS name assigned to the service endpoint in private network A (pne-1111.foo.example.com, in this example) to obtain the local IP address (10.0.0.7, in this example) of the service endpoint on private network A. The VMs may then send service requests for the service to the service endpoint at the local IP address (10.0.0.7) on private network A. At the service endpoint, the service requests are encapsulated with routing information usable to route the encapsulated packets over the network substrate to the IP address of the service, and the encapsulated service requests are sent on to the network substrate of the provider network to be routed to the service. In some embodiments, metadata may be included in or with the encapsulated service requests, for example as indicated in FIG. 7; the metadata may, for example, be used to identify the source of the service request (e.g., the service endpoint on private network A) to the service instances behind a service frontend.

As indicated at 1204, a customer (who may be the same customer or a different customer) requests a service endpoint for the service in a private network B; the service endpoint is assigned a local IP address in the local IP address range of private network B (e.g., 10.0.1.8) and associated with a DNS name for the service on private network B (e.g., pne-2222.foo.example.com). VMs on private network B may resolve the DNS name assigned to the service endpoint in private network B (pne-2222.foo.example.com, in this example) to obtain the local IP address (10.0.1.8, in this example) of the service endpoint on private network B. The VMs may then send service requests for the service to the service endpoint at the local IP address (10.0.1.8) on private network B. At the service endpoint, the service requests are encapsulated with routing information usable to route the encapsulated packets over the network substrate to the IP address of the service, and the encapsulated service requests are sent on to the network substrate of the provider network to be routed to the service. In some embodiments, metadata may be included in or with the encapsulated service requests, for example as indicated in FIG. 7; the metadata may, for example, be used to identify the source of the service request (e.g., the service endpoint on private network B) to the service instances behind a service frontend.

FIG. 11 shows an example interface for registering services, according to some embodiments. In some embodiments, service owners may establish, provision, and manage services 3012 in private networks 3010 on provider network 3000 via one or more APIs 3006 of the provider network 3000 accessed through a management console 3082 on the service owner's network 3080. For example, a service owner may access one or more APIs 3006 to control plane 3004 via a service management interface 3084 displayed on the management console 3082. In some embodiments, the service management interface 3084 may provide one or more graphical and/or textual interface elements that allow service owners to register and manage services 3012 implemented in their private networks 3010 on the provider network 3000. Services 3012 may, for example, be registered in a service catalog 3007 on the provider network 3000. To facilitate the registration and management of services 3012, the APIs 3006 may provide to the service owners, via the interface elements of interface 3084, one or more of the following capabilities:

Ability to view service(s) implemented in specified service private networks.

Ability to specify, for a service, one or more of, but not limited to: the service private network; service name (service X, in this example); service DNS name/domain name (e.g., foo.example.com); service public and/or private IP address(es); service frontends (e.g., load balancer(s)); DNS name server(s) for the service; regions and/or availability zone(s) in which the service is supported; descriptive information for the service; etc.

Ability to specify security for the service (e.g., authentication and authorization, certificates, etc.).

Ability to register a specified service, for example in a service catalog 3007.

Ability to delete registration of a specified service.

In some embodiments, the service management interface 3084 may provide one or more graphical and/or textual interface elements that allow service owners to manage service endpoints to their services 3012 on the provider network 3000. To facilitate the management of service endpoints, the APIs 3006 may provide to the service owners, via the interface elements of interface 3084, one or more of the following capabilities:

Ability to view active and pending service endpoints. An active service endpoint is a service endpoint that has been accepted and activated. A pending service endpoint is a service endpoint that has been requested by a customer, but that has not yet been accepted and activated. For each service endpoint, the interface 3084 may display information including one or more of, but not limited to: a private network (PN) identifier, a service endpoint identifier, descriptive information for the private and/or service endpoint, and status (e.g., pending or active).

Ability to delete active service endpoints.
Ability to accept pending service endpoints.
Ability to reject pending service endpoints.

The service owner may, for example, use a cursor control device to select various interface elements provided by interface 3084 to, for example, specify service information, register a service, delete a service, accept or reject pending service endpoints, delete active service endpoints, scroll through lists of services or service endpoints, etc. Note that the interface 3084 may include other user interface elements than those shown.

In some embodiments, as an alternative to the graphical user interface shown in FIG. 11, at least some of the functionalities of API 3006 may be performed by the service owner through a command line interface (CLI).

FIG. 12 shows an example interface for managing service endpoints in private networks, according to some embodiments. In some embodiments, a customer may request and manage service endpoints 3130 in their private network 3110 (private network 3110C, in this example) on provider network 3100 via one or more APIs 3106 of the provider network 3100 accessed through a management console 3182 on the customer's network 3180. For example, a customer may access one or more APIs 3106 to control plane 3104 via a service endpoint management interface 3186 displayed on the management console 3182. In some embodiments, the service endpoint management interface 3186 may provide one or more graphical and/or textual interface elements that allow customers to request and manage service endpoints 3130 for their private networks 3110 on the provider network 3100. The services 3112 may, for example, be registered in a service catalog 3107 on the provider network 3100. To facilitate requesting service endpoints 3130, the APIs 3106 may provide to the customer, via the interface elements of interface 3186, one or more of the following capabilities:

Ability to specify a private network (PN 3110C, in this example) for which a service endpoint 3130 is to be requested, and/or for which service endpoint(s) 3130 are to be viewed and managed.

Ability to view and select services 3112 that are available on the provider network 3100. For example, the customer may be able to browse services by service type (e.g., provider network services, third party services, private services (e.g., services owned by the customer), frequently used services, new services, etc.). For each service type or category, one or more available services 3112 may be displayed.

Ability to select a service 3112, and to request a service endpoint 3130 in the specified private network 3110 for the selected service 3112. In this example, the customer has selected a service 3112B (implemented in private network 3110B), and has requested a service endpoint 3130B for the service 3130 in private network 3110C.

In some embodiments, the service endpoint management interface 3186 may provide one or more graphical and/or textual interface elements that allow the customer to manage service endpoints 3130 in a selected private network (private network 3100C, in this example) on the provider network 3100. To facilitate the management of service endpoints 3130, the APIs 3106 may provide to the customer, via the interface elements of interface 3186, one or more of the following capabilities:

Ability to view active and pending service endpoints 3130 (active service endpoint 3130A and pending service endpoint 3130B, in this example). An active service endpoint is a service endpoint that has been accepted by the service owner and activated. A pending service endpoint is a service endpoint that has been requested by the customer, but that has not yet been accepted by the service owner. For each service endpoint 3130, the interface 3186 may display information including one or more of, but not limited to: the service name or identifier (service 3112A and 3112B, in this example), a DNS name assigned to the service endpoint 3130, a service endpoint identifier (SE1 corresponding to service endpoint 3130A and SE2 corresponding to service endpoint 3130B, in this example), the local IP address on the private network 3110C for the endpoint (10.0.0.7 and 10.0.1.8, in this example), and status (active for SE1, and pending for SE2, in this example).

Ability to delete active service endpoints.
Ability to cancel pending service endpoints.

The customer may, for example, use a cursor control device to select various interface elements provided by interface 3186 to, for example, specify private networks, browse and select services, request service endpoints for selected services, view and manage lists of service endpoints, etc. Note that the interface 3186 may include other user interface elements than those shown.

In some embodiments, as an alternative to the graphical user interface shown in FIG. 12, at least some of the functionalities of API 3106 may be performed by the customer through a command line interface (CLI).

Figure 13:
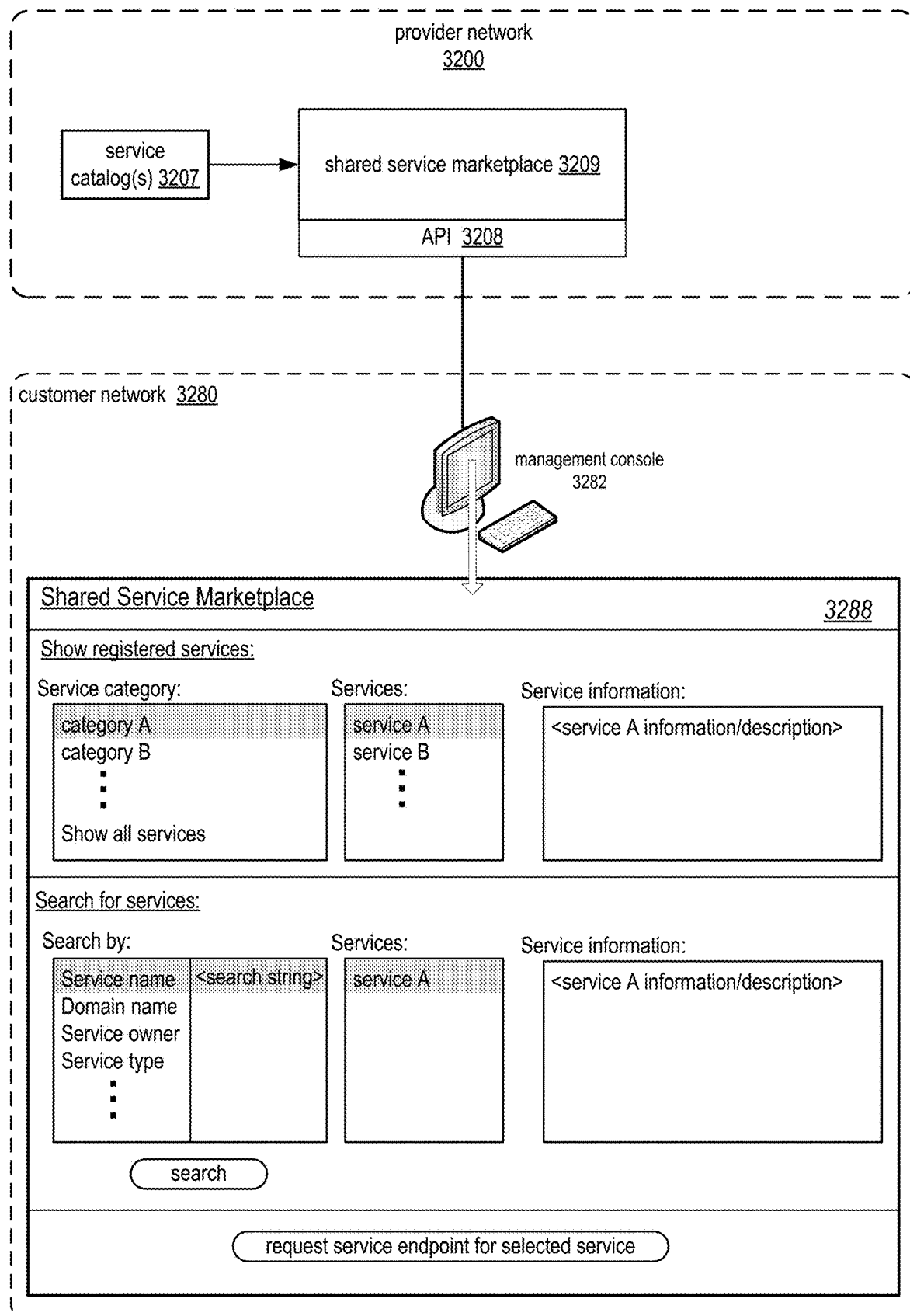
FIG. 13 illustrates a shared service marketplace for a provider network, as well as an example interface to the shared service marketplace, according to some embodiments.

FIG. 13 illustrates a shared service marketplace for a provider network, as well as an example interface to the shared service marketplace, according to some embodiments. In some embodiments, the provider network 3200 or a third party may provide a shared service marketplace 3209 as a repository for information about services that are available to customers of the provider network 3200. In some embodiments, the shared service marketplace 3209 may obtain information about available services from one or more service catalogs 3207, or from other sources such as service owners.

In some embodiments, a customer may access the shared service marketplace 3209 via one or more APIs 3208 accessed through a management console 3282 on the customer's network 3280. For example, a customer may access one or more APIs 3208 to shared service marketplace 3209 via a shared service marketplace interface 3288 displayed on the management console 3282. In some embodiments, the shared service marketplace interface 3288 may provide one or more graphical and/or textual interface elements that allow customers to browse and a services made available through the marketplace 3209, and to request service endpoints for their private networks on the provider network 3200 through the marketplace 3209. The APIs 3208 may provide to the customer, via the interface elements of interface 3288, one or more of the following capabilities:

Ability to browse services that are available through the marketplace 3209. For example, the customer may be able to browse services by service category (as non-limiting examples, business services, network analysis services, social media analysis services, health-related services, printing services, database services, data storage services, data logging services, etc.). For a selected service category, one or more available services may be displayed. In this example, category A is selected, and services A and B are displayed.

Ability to select a service located by the browser to view additional information about and/or a description of the service (including but not limited to cost, if any for acquiring a service endpoint to the service, and any usage costs for the service). In some embodiments, links to websites may be provided so that the customer can obtain additional information about the service from the service owner, service reviewers, news reports, etc.

Ability to search for services that are available through the marketplace 3209. For example, the customer may be able to search services according to one or more criteria (as non-limiting examples, service name, domain name, service owner, service type, etc.). For a selected service criteria, the customer may enter a search string; one or more available services that correspond to the search string may be displayed. In this example, service name is selected, and service A is displayed.

Ability to select a service located by a search to view additional information about and/or a description of the service (including but not limited to cost, if any for acquiring a service endpoint to the service, and any usage costs for the service). In some embodiments, links to websites may be provided so that the customer can obtain additional information about the service from the service owner, service reviewers, news reports, etc.

Ability to request a service endpoint to a selected service that the customer locates by browsing and/or searching the marketplace 3209. For example, selecting "request service endpoint for selected service" may take the customer to an interface 3186 as shown in FIG. 12, or to a similar interface.

The customer may, for example, use a cursor control device to select various interface elements provided by interface 3288 to, for example, browse or search for services, select services, request service endpoints for selected services, etc. Note that the interface 3288 may include other user interface elements than those shown.

Example Provider Network Environment

This section describes example provider network environments in which embodiments of the methods and apparatus described in reference to FIGS. 1 through 13 may be implemented. However, these example provider network environments are not intended to be limiting.

Figure 14:
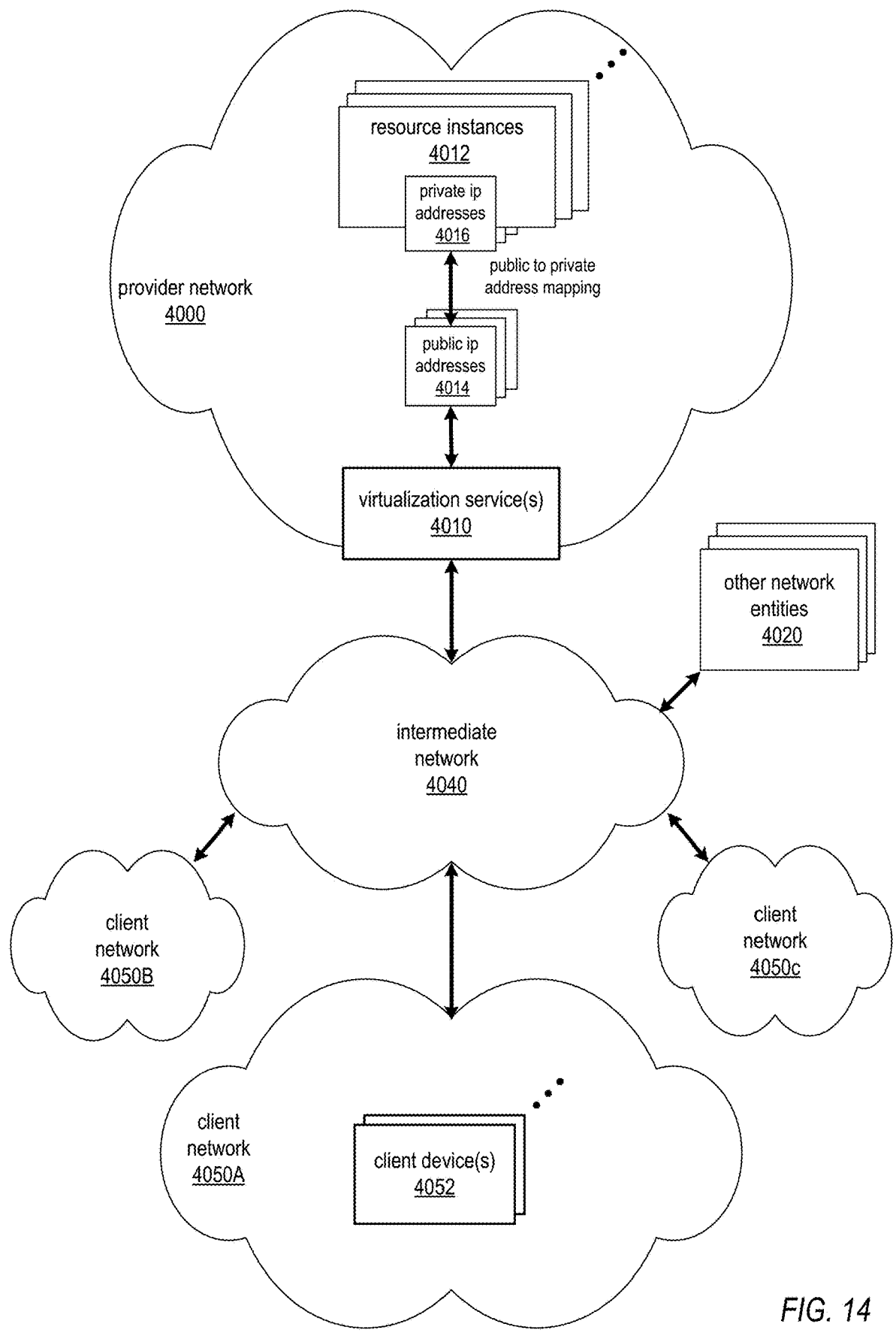
FIG. 14 illustrates an example provider network environment, according to some embodiments.

FIG. 14 illustrates an example provider network environment, according to some embodiments. A provider network 4000 may provide resource virtualization to clients via one or more virtualization services 4010 that allow clients to purchase, rent, or otherwise obtain instances 4012 of virtualized resources, including but not limited to computation and storage resources, implemented on devices within the provider network or networks in one or more data centers. Private IP addresses 4016 may be associated with the resource instances 4012; the private IP addresses are the internal network addresses of the resource instances 4012 on the provider network 4000. In some embodiments, the provider network 4000 may also provide public IP addresses 4014 and/or public IP address ranges (e.g., Internet Protocol version 4 (IPv4) or Internet Protocol version 6 (IPv6) addresses) that clients may obtain from the provider 4000.

Conventionally, the provider network 4000, via the virtualization services 4010, may allow a client of the provider network 4000 (e.g., a client that operates client network 4050A) to dynamically associate at least some public IP addresses 4014 assigned or allocated to the client with particular resource instances 4012 assigned to the client. The provider network 4000 may also allow the client to remap a public IP address 4014, previously mapped to one virtualized computing resource instance 4012 allocated to the client, to another virtualized computing resource instance 4012 that is also allocated to the client. Using the virtualized computing resource instances 4012 and public IP addresses 4014 provided by the provider network 4000, a client of the provider network 4000 such as the operator of client network 4050A may, for example, implement client-specific applications and present the client's applications on an intermediate network 4040, such as the Internet. Other network entities 4020 on the intermediate network 4040 may then generate traffic to a destination public IP address 4014 published by the client network 4050A; the traffic is routed to the provider network 4000 data center, and at the data center is routed, via a network substrate, to the private IP address 4016 of the virtualized computing resource instance 4012 currently mapped to the destination public IP address 4014. Similarly, response traffic from the virtualized computing resource instance 4012 may be routed via the network substrate back onto the intermediate network 4040 to the source entity 4020.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include networking devices or appliances that provide network address translation (NAT) or similar functionality to perform the mapping from public IP addresses to private IP addresses and vice versa.

Public IP addresses, as used herein, are Internet routable network addresses that are assigned to resource instances, either by the provider network 4000 or by the client. Traffic routed to a public IP address is translated, for example via 1:1 network address translation (NAT), and forwarded to the respective private IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a private IP address of a resource instance is the default launch configuration for all resource instance types.

At least some public IP addresses may be allocated to or obtained by clients of the provider network 4000; a client may then assign their allocated public IP addresses to particular resource instances allocated to the client. These public IP addresses may be referred to as client public IP addresses, or simply client IP addresses. Instead of being assigned by the provider network 4000 to resource instances as in the case of standard IP addresses, client IP addresses may be assigned to resource instances by the clients, for example via an API provided by the provider network 4000. Unlike standard IP addresses, client IP Addresses are allocated to client accounts and can be remapped to other resource instances by the respective clients as necessary or desired. A client IP address is associated with a client's account, not a particular resource instance, and the client controls that IP address until the client chooses to release it. Unlike conventional static IP addresses, client IP addresses allow the client to mask resource instance or availability zone failures by remapping the client's public IP addresses to any resource instance associated with the client's account. The client IP addresses, for example, enable a client to engineer around problems with the client's resource instances or software by remapping client IP addresses to replacement resource instances.

Figure 15:
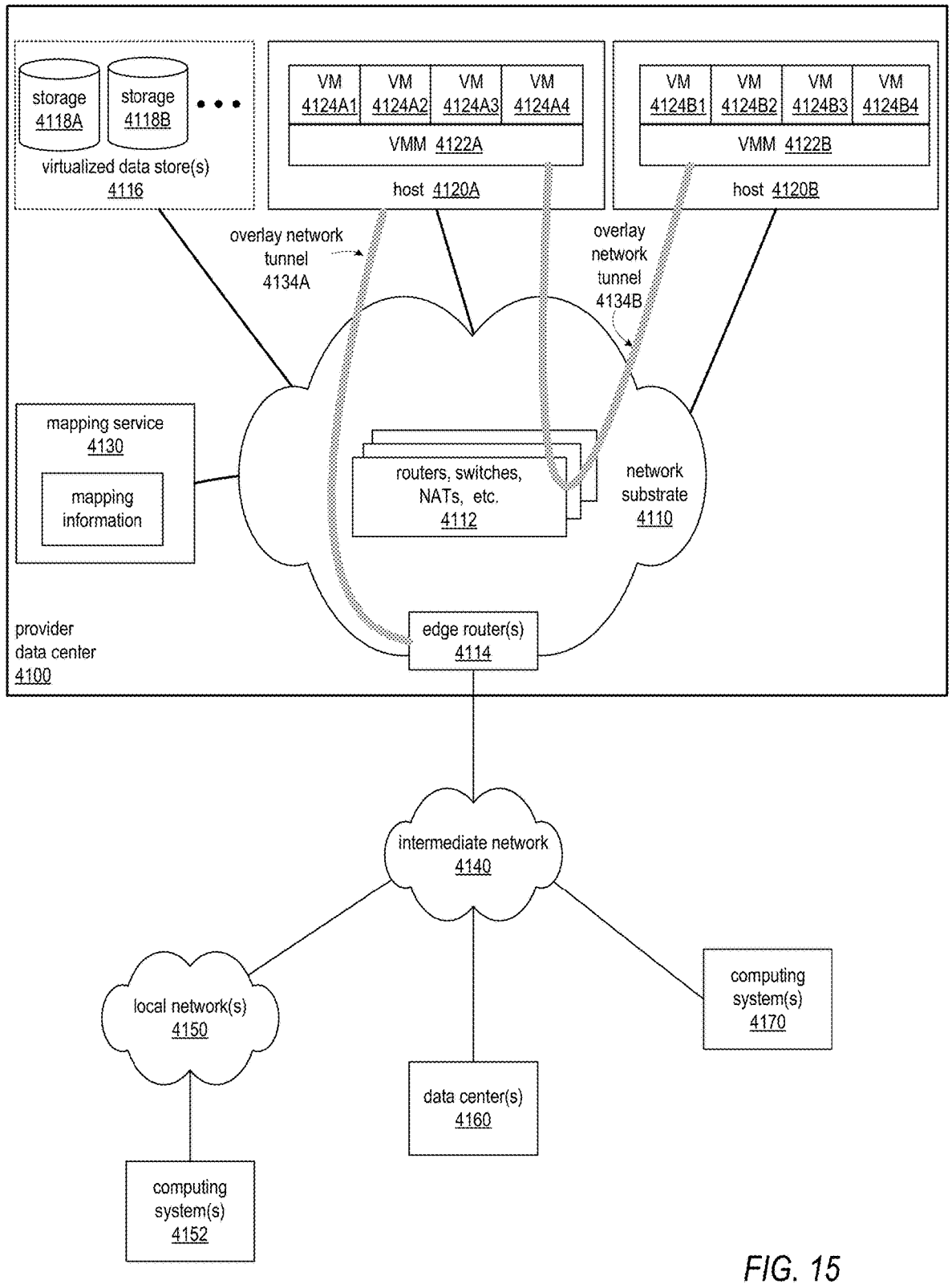
FIG. 15 illustrates an example data center that implements an overlay network on a network substrate using IP tunneling technology, according to some embodiments.

FIG. 15 illustrates an example data center that implements an overlay network on a network substrate using IP tunneling technology, according to some embodiments. A provider data center 4100 may include a network substrate that includes networking devices 4112 such as routers, switches, network address translators (NATs), and so on. Some embodiments may employ an Internet Protocol (IP) tunneling technology to provide an overlay network via which encapsulated packets may be passed through network substrate 4110 using tunnels. The IP tunneling technology may provide a mapping and encapsulating system for creating an overlay network on a network (e.g., a local network in data center 4100 of FIG. 15) and may provide a separate namespace for the overlay layer (the public IP addresses) and the network substrate 4110 layer (the private IP addresses). Packets in the overlay layer may be checked against a mapping directory (e.g., provided by mapping service 4130) to determine what their tunnel substrate target (private IP address) should be. The IP tunneling technology provides a virtual network topology (the overlay network); the interfaces (e.g., service APIs) that are presented to clients are attached to the overlay network so that when a client provides an IP address to which the client wants to send packets, the IP address is run in virtual space by communicating with a mapping service (e.g., mapping service 4130) that knows where the IP overlay addresses are.

In some embodiments, the IP tunneling technology may map IP overlay addresses (public IP addresses) to substrate IP addresses (private IP addresses), encapsulate the packets in a tunnel between the two namespaces, and deliver the packet to the correct endpoint via the tunnel, where the encapsulation is stripped from the packet. In FIG. 15, an example overlay network tunnel 4134A from a virtual machine (VM) 4124A on host 4120A to a device on the intermediate network 4150 and an example overlay network tunnel 4134B between a VM 4124B on host 4120B and a VM 4124C on host 4120C are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (private IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the private IP addresses.

Referring to FIG. 15, at least some networks in which embodiments may be implemented may include hardware virtualization technology that enables multiple operating systems to run concurrently on a host computer (e.g., hosts 4120A and 4120B of FIG. 15), i.e. as virtual machines (VMs) 4124 on the hosts 4120. The VMs 4124 may, for example, be executed in slots on the hosts 4120 that are rented or leased to clients of a network provider. A hypervisor, or virtual machine monitor (VMM) 4122, on a host 4120 presents the VMs 4124 on the host with a virtual platform and monitors the execution of the VMs 4124. Each VM 4124 may be provided with one or more private IP addresses; the VMM 4122 on a host 4120 may be aware of the private IP addresses of the VMs 4124 on the host. A mapping service 4130 may be aware of all network IP prefixes and the IP addresses of routers or other devices serving IP addresses on the local network. This includes the IP addresses of the VMMs 4122 serving multiple VMs 4124. The mapping service 4130 may be centralized, for example on a server system, or alternatively may be distributed among two or more server systems or other devices on the network. A network may, for example, use the mapping service technology and IP tunneling technology to, for example, route data packets between VMs 4124 on different hosts 4120 within the data center 4100 network; note that an interior gateway protocol (IGP) may be used to exchange routing information within such a local network.

In addition, a network such as the provider data center 4100 network (which is sometimes referred to as an autonomous system (AS)) may use the mapping service technology, IP tunneling technology, and routing service technology to route packets from the VMs 4124 to Internet destinations, and from Internet sources to the VMs 4124. Note that an external gateway protocol (EGP) or border gateway protocol (BGP) is typically used for Internet routing between sources and destinations on the Internet. FIG. 15 shows an example provider data center 4100 implementing a network that provides resource virtualization technology and that provides full Internet access via edge router(s) 4114 that connect to Internet transit providers, according to some embodiments. The provider data center 4100 may, for example, provide clients the ability to implement virtual computing systems (VMs 4124) via a hardware virtualization service and the ability to implement virtualized data stores 4116 on storage resources 4118 via a storage virtualization service.

The data center 4100 network may implement IP tunneling technology, mapping service technology, and a routing service technology to route traffic to and from virtualized resources, for example to route packets from the VMs 4124 on hosts 4120 in data center 4100 to Internet destinations, and from Internet sources to the VMs 4124. Internet sources and destinations may, for example, include computing systems 4170 connected to the intermediate network 4140 and computing systems 4152 connected to local networks 4150 that connect to the intermediate network 4140 (e.g., via edge router(s) 4114 that connect the network 4150 to Internet transit providers). The provider data center 4100 network may also route packets between resources in data center 4100, for example from a VM 4124 on a host 4120 in data center 4100 to other VMs 4124 on the same host or on other hosts 4120 in data center 4100.

In some embodiments, a provider network 4000 may also include additional data center(s) 4160 that include hardware virtualization technology similar to data center 4100 and that may also be connected to intermediate network 4140. Packets may be forwarded from data center 4100 to other data centers 4160, for example from a VM 4124 on a host 4120 in data center 4100 to another VM on another host in another, similar data center 4160, and vice versa.

While the above describes hardware virtualization technology that enables multiple operating systems to run concurrently on host computers as virtual machines (VMs) on the hosts, where the VMs may be instantiated on slots on hosts that are rented or leased to clients of the network provider, the hardware virtualization technology may also be used to provide other computing resources, for example storage resources 4118, as virtualized resources to clients of a network provider in a similar manner.

Figure 16:
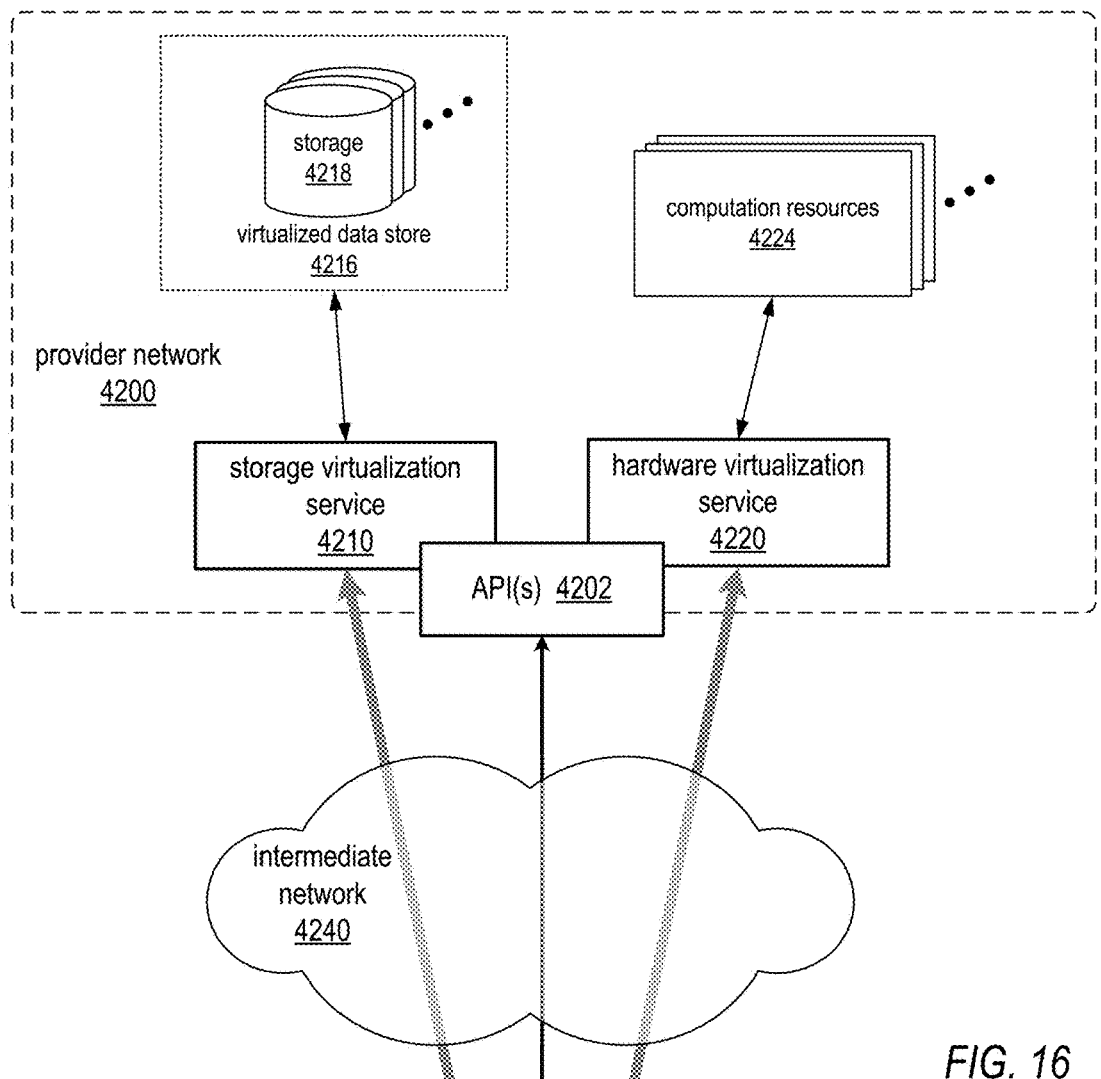
FIG. 16 is a block diagram of an example provider network that provides a storage virtualization service and a hardware virtualization service to clients, according to some embodiments.
Figure 16:
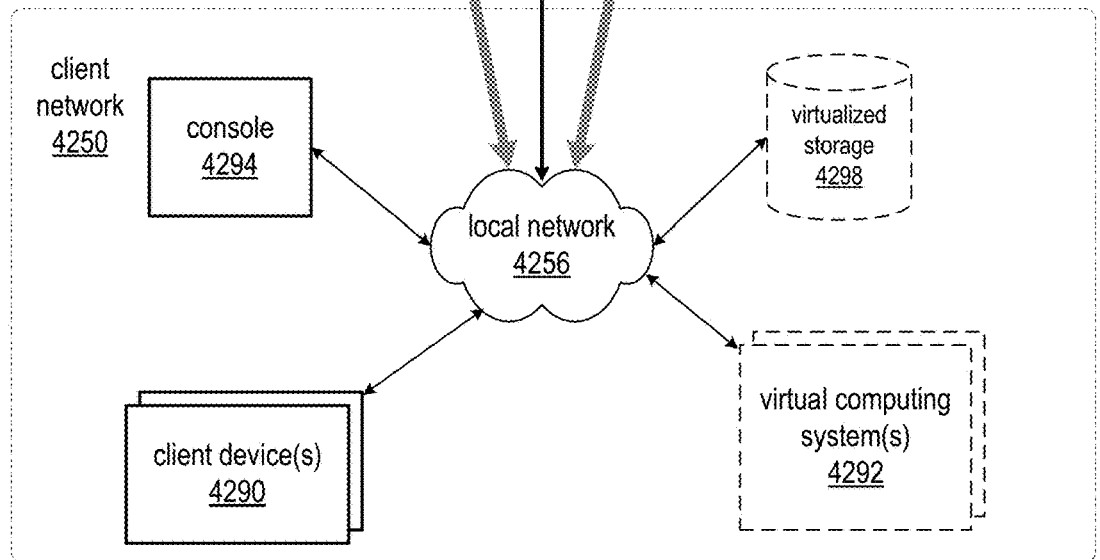

FIG. 16 is a block diagram of an example provider network that provides a storage virtualization service and a hardware virtualization service to clients, according to some embodiments. Hardware virtualization service 4220 provides multiple computation resources 4224 (e.g., VMs) to clients. The computation resources 4224 may, for example, be rented or leased to clients of the provider network 4200 (e.g., to a client that implements client network 4250). Each computation resource 4224 may be provided with one or more private IP addresses. Provider network 4200 may be configured to route packets from the private IP addresses of the computation resources 4224 to public Internet destinations, and from public Internet sources to the computation resources 4224.

Provider network 4200 may provide a client network 4250, for example coupled to intermediate network 4240 via local network 4256, the ability to implement virtual computing systems 4292 via hardware virtualization service 4220 coupled to intermediate network 4240 and to provider network 4200. In some embodiments, hardware virtualization service 4220 may provide one or more APIs 4202, for example a web services interface, via which a client network 4250 may access functionality provided by the hardware virtualization service 4220, for example via a console 4294. In some embodiments, at the provider network 4200, each virtual computing system 4292 at client network 4250 may correspond to a computation resource 4224 that is leased, rented, or otherwise provided to client network 4250.

From an instance of a virtual computing system 4292 and/or another client device 4290 or console 4294, the client may access the functionality of storage virtualization service 4210, for example via one or more APIs 4202, to access data from and store data to a virtual data store 4216 provided by the provider network 4200. In some embodiments, a virtualized data store gateway (not shown) may be provided at the client network 4250 that may locally cache at least some data, for example frequently accessed or critical data, and that may communicate with virtualized data store service 4210 via one or more communications channels to upload new or modified data from a local cache so that the primary store of data (virtualized data store 4216) is maintained. In some embodiments, a user, via a virtual computing system 4292 and/or on another client device 4290, may mount and access virtual data store 4216 volumes, which appear to the user as local virtualized storage 4298.

While not shown in FIG. 16, the virtualization service(s) may also be accessed from resource instances within the provider network 4200 via API(s) 4202. For example, a client, appliance service provider, or other entity may access a virtualization service from within a respective virtual network on the provider network 4200 via an API 4202 to request allocation of one or more resource instances within the virtual network or within another virtual network.

Figure 17:
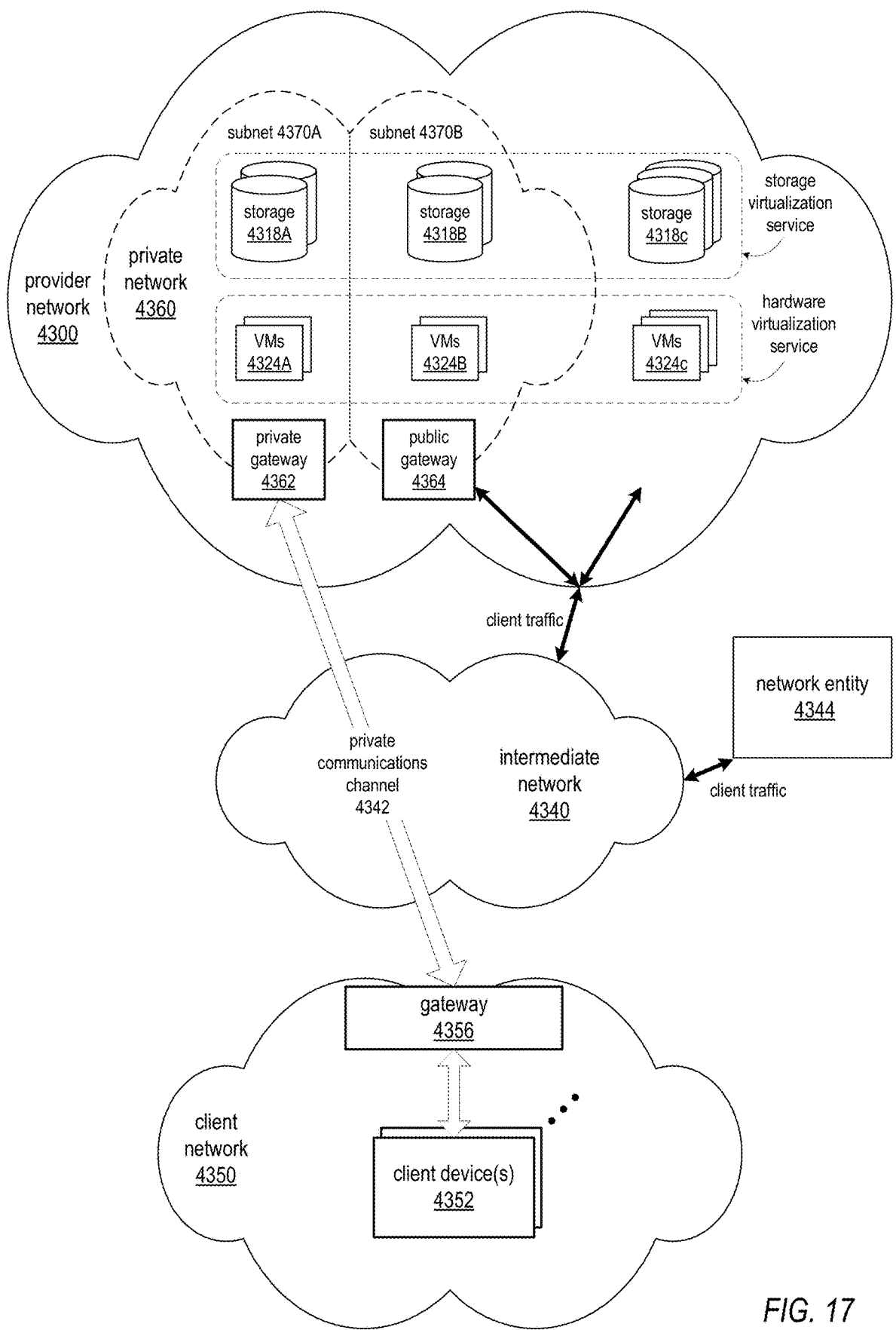
FIG. 17 illustrates an example provider network that provides virtual networks to at least some clients, according to some embodiments.

FIG. 17 illustrates an example provider network that provides virtual networks on the provider network to at least some clients, according to some embodiments. A client's virtual network 4360 on a provider network 4300, for example, enables a client to connect their existing infrastructure (e.g., devices 4352) on client network 4350 to a set of logically isolated resource instances (e.g., VMs 4324A and 4324B and storage 4318A and 4318B), and to extend management capabilities such as security services, firewalls, and intrusion detection systems to include their resource instances.

A client's virtual network 4360 may be connected to a client network 4350 via a private communications channel 4342. A private communications channel 4342 may, for example, be a tunnel implemented according to a network tunneling technology or some other technology over an intermediate network 4340. The intermediate network may, for example, be a shared network or a public network such as the Internet. Alternatively, a private communications channel 4342 may be implemented over a direct, dedicated connection between virtual network 4360 and client network 4350.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In some embodiments, either a shared network or a public network may serve as an intermediate network between a provider network and a client network.

To establish a virtual network 4360 for a client on provider network 4300, one or more resource instances (e.g., VMs 4324A and 4324B and storage 4318A and 4318B) may be allocated to the virtual network 4360. Note that other resource instances (e.g., storage 4318C and VMs 4324C) may remain available on the provider network 4300 for other client usage. A range of public IP addresses may also be allocated to the virtual network 4360. In addition, one or more networking devices (routers, switches, etc.) of the provider network 4300 may be allocated to the virtual network 4360. A private communications channel 4342 may be established between a private gateway 4362 at virtual network 4360 and a gateway 4356 at client network 4350.

In some embodiments, in addition to, or instead of, a private gateway 4362, virtual network 4360 may include a public gateway 4364 that enables resources within virtual network 4360 to communicate directly with entities (e.g., network entity 4344) via intermediate network 4340, and vice versa, instead of or in addition to via private communications channel 4342.

Virtual network 4360 may be, but is not necessarily, subdivided into two or more subnetworks, or subnets, 4370. For example, in implementations that include both a private gateway 4362 and a public gateway 4364, a virtual network 4360 may be subdivided into a subnet 4370A that includes resources (VMs 4324A and storage 4318A, in this example) reachable through private gateway 4362, and a subnet 4370B that includes resources (VMs 4324B and storage 4318B, in this example) reachable through public gateway 4364.

The client may assign particular client public IP addresses to particular resource instances in virtual network 4360. A network entity 4344 on intermediate network 4340 may then send traffic to a public IP address published by the client; the traffic is routed, by the provider network 4300, to the associated resource instance. Return traffic from the resource instance is routed, by the provider network 4300, back to the network entity 4344 over intermediate network 4340. Note that routing traffic between a resource instance and a network entity 4344 may require network address translation to translate between the public IP address and the private IP address of the resource instance.

Some embodiments may allow a client to remap public IP addresses in a client's virtual network 4360 as illustrated in FIG. 17 to devices on the client's external network 4350. When a packet is received (e.g., from network entity 4344), the network 4300 may determine that the destination IP address indicated by the packet has been remapped to an endpoint on external network 4350 and handle routing of the packet to the respective endpoint, either via private communications channel 4342 or via the intermediate network 4340. Response traffic may be routed from the endpoint to the network entity 4344 through the provider network 4300, or alternatively may be directly routed to the network entity 4344 by the client network 4350. From the perspective of the network entity 4344, it appears as if the network entity 4344 is communicating with the public IP address of the client on the provider network 4300. However, the network entity 4344 has actually communicated with the endpoint on client network 4350.

While FIG. 17 shows network entity 4344 on intermediate network 4340 and external to provider network 4300, a network entity may be an entity on provider network 4300. For example, one of the resource instances provided by provider network 4300 may be a network entity that sends traffic to a public IP address published by the client.

Illustrative System

Figure 18:
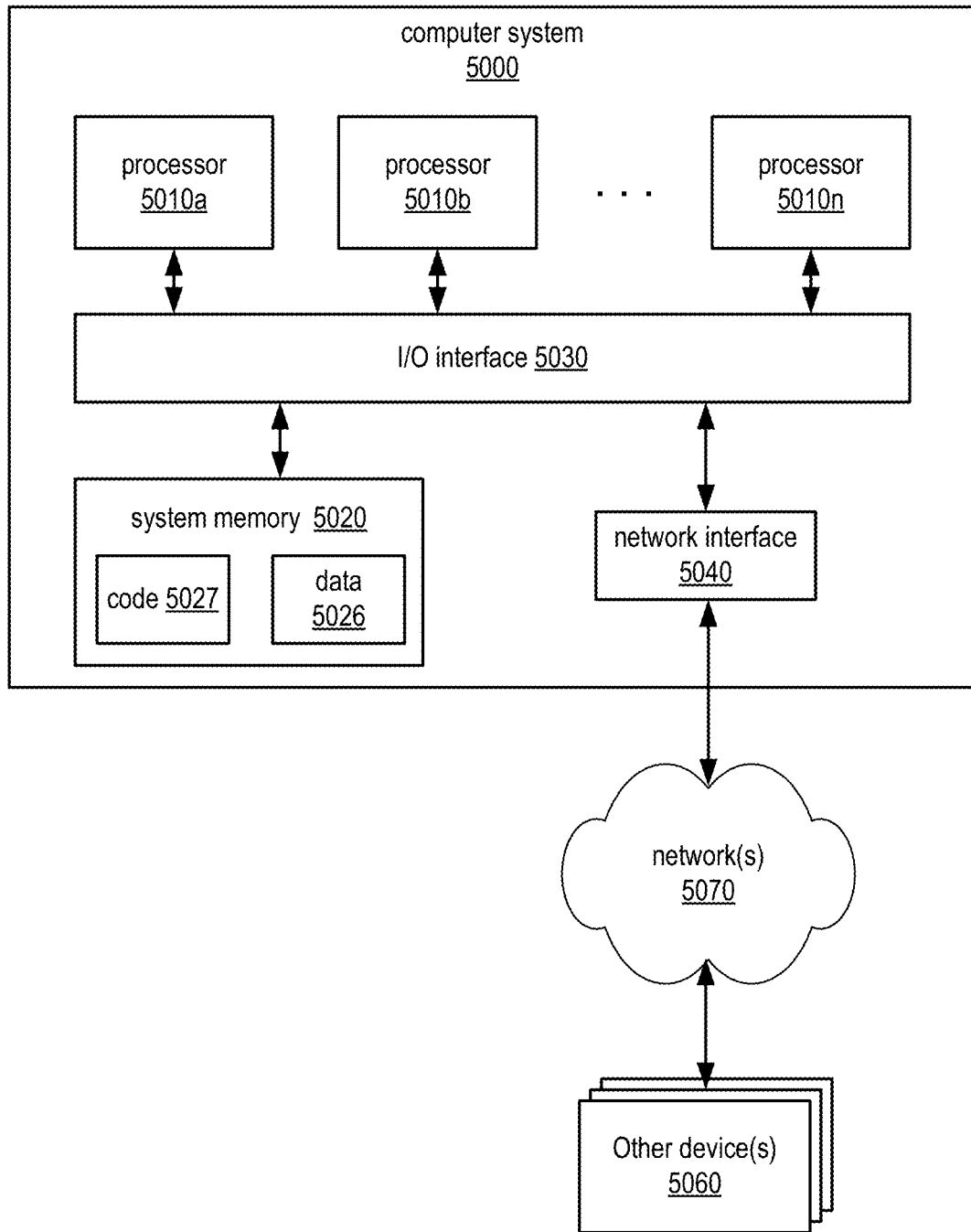
FIG. 18 is a block diagram illustrating an example computer system that may be used in some embodiments.

In some embodiments, a system that implements a portion or all of the methods and apparatus for providing service endpoints to services in provider network environments as described herein may include a general-purpose computer system that includes or is configured to access one or more computer-accessible media, such as computer system 5000 illustrated in FIG. 18. In the illustrated embodiment, computer system 5000 includes one or more processors 5010 coupled to a system memory 5020 via an input/output (I/O) interface 5030. Computer system 5000 further includes a network interface 5040 coupled to I/O interface 5030. While FIG. 18 shows computer system 5000 as a single computing device, in various embodiments a computer system 5000 may include one computing device or any number of computing devices configured to work together as a single computer system 5000.

In various embodiments, computer system 5000 may be a uniprocessor system including one processor 5010, or a multiprocessor system including several processors 5010 (e.g., two, four, eight, or another suitable number). Processors 5010 may be any suitable processors capable of executing instructions. For example, in various embodiments, processors 5010 may be general-purpose or embedded processors implementing any of a variety of instruction set architectures (ISAs), such as the x86, PowerPC, SPARC, or MIPS ISAs, or any other suitable ISA. In multiprocessor systems, each of processors 5010 may commonly, but not necessarily, implement the same ISA.

System memory 5020 may be configured to store instructions and data accessible by processor(s) 5010. In various embodiments, system memory 5020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for providing service endpoints to services in provider network environments, are shown stored within system memory 5020 as code 5025 and data 5026.

In one embodiment, I/O interface 5030 may be configured to coordinate I/O traffic between processor 5010, system memory 5020, and any peripheral devices in the device, including network interface 5040 or other peripheral interfaces. In some embodiments, I/O interface 5030 may perform any necessary protocol, timing or other data transformations to convert data signals from one component (e.g., system memory 5020) into a format suitable for use by another component (e.g., processor 5010). In some embodiments, I/O interface 5030 may include support for devices attached through various types of peripheral buses, such as a variant of the Peripheral Component Interconnect (PCI) bus standard or the Universal Serial Bus (USB) standard, for example. In some embodiments, the function of I/O interface 5030 may be split into two or more separate components, such as a north bridge and a south bridge, for example. Also, in some embodiments some or all of the functionality of I/O interface 5030, such as an interface to system memory 5020, may be incorporated directly into processor 5010.

Network interface 5040 may be configured to allow data to be exchanged between computer system 5000 and other devices 5060 attached to a network or networks 5050, such as other computer systems or devices as illustrated in FIGS. 1 through 17, for example. In various embodiments, network interface 5040 may support communication via any suitable wired or wireless general data networks, such as types of Ethernet network, for example. Additionally, network interface 5040 may support communication via telecommunications/telephony networks such as analog voice networks or digital fiber communications networks, via storage area networks such as Fibre Channel SANs, or via any other suitable type of network and/or protocol.

In some embodiments, system memory 5020 may be one embodiment of a computer-accessible medium configured to store program instructions and data as described above for FIGS. 1 through 13 for providing customer hosted endpoints in provider network environments. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 5000 via I/O interface 5030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 5000 as system memory 5020 or another type of memory. Further, a computer-accessible medium may include transmission media or signals such as electrical, electromagnetic, or digital signals, conveyed via a communication medium such as a network and/or a wireless link, such as may be implemented via network interface 5040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising;
a first virtual network that implements a service executing on virtual machines on a provider network, wherein a frontend to the service is assigned an IP address on the first virtual network, and wherein a domain name system (DNS) name is associated with the service;
a second virtual network including one or more virtual machines on the provider network;
a control plane implemented by one or more devices on the provider network, the control plane including a processor and memory that includes instructions that upon execution cause the control plane to:
receive, via an application programming interface (API), a request to establish a service endpoint for the service on the second virtual network, wherein the request specifies a local IP address for the service endpoint in an IP address range of the second virtual network and a local DNS name for the service on the second virtual network different from the DNS name associated with the service, and in response:
generate the service endpoint for the service on the second virtual network in response to the request to route service requests for the service from the second virtual network to the first virtual network, wherein the service endpoint is assigned the local IP address;
configure a DNS service on the provider network to assign the local DNS name for the service to the local IP address of the service endpoint, so that the service is invocable within the second virtual network via the local DNS name instead of the DNS name; and
generate routing information to encapsulate packets addressed to the local IP address of the service endpoint from the one or more virtual machines on the second virtual network, the routing information usable to route the packets through a network substrate of the provider network to the frontend of the service on the first virtual network.

2. The system as recited in claim 1, wherein a virtual machine on the second virtual network includes instructions that upon execution cause the virtual machine to:
resolve the local DNS name of the service endpoint to obtain the local IP address of the service endpoint on the second virtual network; and
send service requests for the service to the local IP address of the service endpoint on the second virtual network;
wherein, at the service endpoint, the service requests are encapsulated and sent on to the network substrate of the provider network to be routed to the frontend of the service on the first virtual network.

3. The system as recited in claim 2, wherein the frontend to the service includes instructions that upon execution cause the frontend to:
add information identifying the service endpoint to the service requests received from the service endpoint on the second virtual network and send the service requests to the virtual machines on the first virtual network; and
encapsulate responses to the service requests with routing information usable to route the packets through the network substrate of the provider network to the service endpoint on the second virtual network and send the encapsulated responses on to the network substrate of the provider network to be routed to the service endpoint on the second virtual network.

4. The system as recited in claim 1, wherein the provider network further comprises a third virtual network including virtual machines on the provider network, and wherein the instructions upon execution further cause the control plane to:
receive, via the API, a request to establish a service endpoint for the service on the third virtual network;
generate a service endpoint for the service on the third virtual network in response to the request, wherein the service endpoint is assigned a local IP address in an IP address range of the third virtual network; and
assign another local DNS name to the service endpoint on the third virtual network;
wherein the other local DNS name assigned to the service endpoint on the third virtual network is different than the local DNS name assigned to the service endpoint on the second virtual network.

5. A method, comprising:
receiving a request to establish a service endpoint in a virtual network on a provider network for a service external to the virtual network, wherein a domain name system (DNS) name is associated with the service, wherein the request specifies a local IP address for the service endpoint in an IP address range of the virtual network and a local DNS name for the service in the virtual network different from the DNS name associated with the service, and in response:
generating the service endpoint for the service in the virtual network in response to the request to route service requests from the virtual network to the service external to the virtual network, wherein the service endpoint is assigned the local IP address;
configure a DNS service on the provider network to assign the local DNS name to the local IP address of the service endpoint, so that the service is invocable within the virtual network via the local DNS name instead of the DNS name; and
generate routing information to encapsulate packets addressed to the local IP address of the service endpoint from virtual machines on the virtual network, the routing information usable to route the packets through a network substrate of the provider network to the service.

6. The method as recited in claim 5, wherein the service is implemented as one or more virtual machines in another virtual network on the provider network.

7. The method as recited in claim 6, wherein the virtual machines are behind a virtualized load balancer in the other virtual network, and wherein the IP address of the service is assigned to the load balancer.

8. The method as recited in claim 5, wherein the service is implemented by one or more devices on the provider network.

9. The method as recited in claim 5, wherein the service is implemented in a network external to the provider network.

10. The method as recited in claim 5, further comprising:
resolving, by a virtual machine on the virtual network, the local DNS name of the service endpoint to obtain the local IP address of the service endpoint in the virtual network;
sending, by the virtual machine, service requests for the service to the local IP address of the service endpoint in the virtual network; and
at the service endpoint, encapsulating the service requests and sending the encapsulated service requests on to the network substrate of the provider network to be routed to the service.

11. The method as recited in claim 10, wherein the IP address of the service is assigned to a frontend to the service, the method further comprising adding, by the frontend, information identifying the service endpoint to the service requests received from the service endpoint on the virtual network and sending the service requests to one or more service instances of the service.

12. The method as recited in claim 11, further comprising encapsulating, by the frontend to the service, responses to the service requests and sending the encapsulated responses on to the network substrate of the provider network to be routed to the service endpoint on the virtual network.

13. The method as recited in claim 10, wherein the service requests sent to the frontend from the service endpoint on the virtual network include information identifying the service endpoint on the virtual network.

14. The method as recited in claim 13, wherein the service requests sent to the frontend from the service endpoint on the virtual network further include one or more of:
information identifying an account that owns the virtual network; or
authentication and authorization information for the virtual network.

15. The method as recited in claim 5, further comprising:
generating a second service endpoint for the service in the virtual network, wherein the second service endpoint is assigned a different local IP address in the IP address range of the virtual network; and
assigning another local DNS name to the second service endpoint in the virtual network;
wherein the local DNS name assigned to the service endpoint in the virtual network resolves to the local IP address assigned to the service endpoint, and wherein the other local DNS name assigned to the second service endpoint in the virtual network resolves to the local IP address assigned to the second service endpoint.

16. The method as recited in claim 5, further comprising:
receiving service requests at the IP address of the service from the service endpoint in the virtual network, wherein the service requests received from the service endpoint in the virtual network include information identifying the service endpoint in the virtual network; and
receiving service requests at the IP address of the service from another service endpoint in a virtual network on the provider network, wherein the service requests received from the other service endpoint include information identifying the other service endpoint.

17. The method as recited in claim 5, further comprising:
receiving, via an API, a request to register the service on the provider network, wherein the request to register the service specifies the IP address of the service and the DNS name associated with the service; and
registering the service with a catalog service of the provider network, wherein services registered with the catalog service are discoverable by customers of the provider network through an API to the catalog service.

18. The method as recited in claim 5, further comprising:
registering a plurality of services with a catalog service of the provider network;
providing an interface to the catalog service to customers of the provider network, wherein the interface includes user interface elements that allow a customer to search the plurality of services to discover services of interest to the customer, select a service from among the plurality of services, and request a service endpoint to the selected service for a specified private network.

19. A non-transitory computer-readable storage medium storing program instructions that when executed on one or more computers on a provider network cause the one or more computers to:
provide, to a service owner via an application programming interface (API), a request to establish a service endpoint in a virtual network on the provider network for a service external to the virtual network, wherein the request specifies a local IP address for the service endpoint in an IP address range of the virtual network and a local domain name service (DNS) name for the service in the virtual network different from a DNS name associated with the service;
receive, from the service owner via the API, acceptance of the request to establish the service endpoint;
generate, in response to the acceptance, the service endpoint for the service in the virtual network to route service requests from the virtual network to the service external to the virtual network, wherein the service endpoint is assigned the local IP address;
configure a DNS service on the provider network to assign the local DNS name to the local IP address of the service endpoint, so that the service is invocable within the virtual network via the local DNS name instead of the DNS name;
wherein the service is accessed by resource instances on the virtual network through the service endpoint on the virtual network, and wherein packets received at the service endpoint from virtual machines on the virtual network are encapsulated with routing information usable to route the packets through a network substrate of the provider network to the service.

20. The non-transitory computer-accessible storage medium as recited in claim 19, wherein the program instructions, when executed on the one or more computers on the provider network, further cause the one or more computers to:
receive, from the service owner via the API, a request to register the service, wherein the request to register the service specifies the IP address of the service and the DNS name associated with the service; and
register the service with a catalog service of the provider network, wherein services registered with the catalog service are discoverable by customers of the provider network through an API to the catalog service.

* * * * *